US012803191B2

(12) United States Patent
Bhosale et al.

(10) Patent No.: US 12,803,191 B2
(45) Date of Patent: Nov. 17, 2026

(54) WIRING DEVICES WITH QUICK ACTING WIRE TERMINALS

(71) Applicant: Leviton Manufacturing Co., Inc., Melville, NY (US)

(72) Inventors: Vikramsinh P. Bhosale, Westbury, NY (US); Zachary Ednie, Farmingdale, NY (US); Keith Gaedje, Setauket, NY (US); Jeffrey Tam, Glen Oaks, NY (US); Peter Dean Kouretsos, Lindenhurst, NY (US); Nicolae Bodrug, Wantagh, NY (US); Michael Mattei, Saint James, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 289 days.

(21) Appl. No.: 18/633,089

(22) Filed: Apr. 11, 2024

(65) Prior Publication Data

US 2025/0323432 A1 Oct. 16, 2025

(51) Int. Cl.
*H01R 4/48* (2006.01)
*H01H 1/58* (2006.01)

(52) U.S. Cl.
CPC ......... *H01R 4/4828* (2023.08); *H01H 1/5844* (2013.01); *H01R 4/4811* (2023.08)

(58) Field of Classification Search
CPC .. H01R 4/4828; H01R 4/4811; H01R 4/4826; H01R 4/4809; H01R 4/483; H01R 4/64; H01R 25/006; H01R 24/78; H01R 4/4821; H01R 4/485; H01R 4/4852; H01H 1/5844; H01H 83/02; H01H 71/524
See application file for complete search history.

(56) References Cited

U.S. PATENT DOCUMENTS

| | | | |
|---|---|---|---|
| 4,759,726 | A | 7/1988 | Naylor |
| 6,250,950 | B1 | 6/2001 | Pallai |
| 6,749,449 | B2 | 6/2004 | Mortun |
| 7,114,986 | B1 | 10/2006 | Toly |
| 7,909,664 | B2 | 3/2011 | Ilkhanov |

(Continued)

FOREIGN PATENT DOCUMENTS

| | | | |
|---|---|---|---|
| CN | 111697357 | A | 9/2020 |
| DE | 102019116930 | A1 | 12/2020 |

(Continued)

OTHER PUBLICATIONS

International Search Report and Written Opinion for the International Patent Application No. PCT/US2023/011397, mailed May 4, 2023, 18 pages.

(Continued)

*Primary Examiner* — Edwin A. Leon
(74) *Attorney, Agent, or Firm* — KDW Firm PLLC

(57) ABSTRACT

Wiring devices are disclosed. In some embodiments, the wiring device may include wire terminals and/or termination mechanisms arranged and configured to electrically and mechanically couple an electrical wire to the wiring device. In some embodiments, the wiring device may be in the form of a commercial or industrial grade electrical receptacle including a wrap-around strap. Alternatively, in some embodiments, the wiring device may be in the form of a three-way switch. In addition, and/or alternatively, an improved spring clamp is disclosed.

21 Claims, 16 Drawing Sheets

(56) References Cited

U.S. PATENT DOCUMENTS

| | | | | |
|---|---|---|---|---|
| 7,963,812 | B2 | 6/2011 | Ilkhanov | |
| 8,047,883 | B2 | 11/2011 | Montalbano | |
| 8,137,145 | B2 | 3/2012 | Joy | |
| 8,444,443 | B2 | 5/2013 | Schafmeister | |
| 8,475,191 | B2 | 7/2013 | Schafmeister | |
| 9,124,034 | B2 | 9/2015 | Kollmann | |
| 9,252,520 | B1 | 2/2016 | Weiden | |
| 9,413,082 | B2 | 8/2016 | Gassauer | |
| 9,466,895 | B2 | 10/2016 | Kollmann | |
| 9,502,790 | B2 | 11/2016 | Kollmann | |
| 9,812,822 | B2 * | 11/2017 | Scanzillo | H01R 4/48 |
| 10,230,179 | B2 | 3/2019 | Wilinski | |
| 10,418,727 | B1 | 9/2019 | Wu | |
| 10,461,444 | B2 | 10/2019 | Scanzillo | |
| 11,495,895 | B2 | 11/2022 | Scanzillo | |
| 11,705,667 | B2 | 7/2023 | Moser | |
| 11,791,573 | B2 * | 10/2023 | Kamor | H01R 4/489 439/743 |
| 12,068,566 | B2 * | 8/2024 | Scanzillo | H01R 4/5008 |
| 2002/0067582 | A1 | 6/2002 | Germain | |
| 2002/0135958 | A1 | 9/2002 | Germain | |
| 2005/0030685 | A1 | 2/2005 | DiSalvo | |
| 2006/0279886 | A1 | 12/2006 | Huang | |
| 2007/0041134 | A1 | 2/2007 | Huang | |
| 2007/0066143 | A1 | 3/2007 | Lin et al. | |
| 2010/0003865 | A1 | 1/2010 | Alderson | |
| 2010/0304596 | A1 | 12/2010 | Ilkhanov | |
| 2011/0130015 | A1 | 6/2011 | Lacey | |
| 2011/0279933 | A1 | 11/2011 | Campolo | |
| 2013/0005175 | A1 | 1/2013 | Rineau et al. | |
| 2013/0157520 | A1 | 6/2013 | Koellmann | |
| 2015/0372402 | A1 | 12/2015 | Kollmann | |
| 2016/0020543 | A1 | 1/2016 | Tedeschi | |
| 2016/0190713 | A1 | 6/2016 | Wu et al. | |
| 2018/0331438 | A1 | 11/2018 | Moser | |
| 2020/0350706 | A1 | 11/2020 | Scanzillo | |
| 2021/0083409 | A1 | 3/2021 | Hartmann | |
| 2022/0294130 | A1 | 9/2022 | Ding | |
| 2023/0024505 | A1 | 1/2023 | Scanzillo | |
| 2023/0036314 | A1 | 2/2023 | Scanzillo | |
| 2023/0327377 | A1 | 10/2023 | Scanzillo | |

FOREIGN PATENT DOCUMENTS

| | | | |
|---|---|---|---|
| DE | 102020104140 | A1 | 8/2021 |
| DE | 102020118578 | A1 | 1/2022 |
| EP | 1956684 | A2 | 8/2008 |
| EP | 2096714 | A1 | 9/2009 |
| EP | 2355249 | A1 | 8/2011 |
| WO | 2014191676 | A1 | 12/2014 |

OTHER PUBLICATIONS

International Search Report and Written Opinion for the International Patent Application No. PCT/US2023/011392, mailed May 4, 2023, 16 pages.

International Search Report and Written Opinion for International Application No. PCT/US2025/025714, filing date Apr. 22, 2025, 12 pages.

International Search Report and Written Opinion for International Application No. PCT/US 24/23075, dated Aug. 30, 2024, 12 pages.

* cited by examiner

WIRING DEVICES WITH QUICK ACTING WIRE TERMINALS

TECHNICAL FIELD

The present disclosure is directed to wiring devices and, more particularly, to specialized wiring devices such as, for example, commercial or industrial grade electrical receptacles utilizing wrap-around electrical straps, three-way electrical switches, etc. In addition, and/or alternatively, the present disclosure provides an improved spring clamp for use in a wire terminal or wire termination mechanism to facilitate easier and quicker electrical wire installation in the field.

BACKGROUND

To route, install and otherwise use AC electrical power, manufacturers produce many different kinds of devices. These devices are referred to herein as wiring devices. Examples of wiring devices include electrical receptacles, switches, dimmers, sensors, ground/arc fault circuit interrupters, and fan speed controls. Wiring devices are connected to the AC electrical power via wires/conductors (the terms wire and conductor may be used hereinafter synonymously), which can include solid core conductors and/or stranded wire conductors. A wire includes (or is considered to be) a conductive path for carrying the AC electrical power.

Wiring devices typically include wire termination terminals for terminating wires. Terminal types typically found on wiring devices include sets of line and load terminals and/or ground terminals. Each set of line and/or load terminals typically include individual phase and neutral terminals. Together these terminals, depending on the mechanical configuration, may be wired using one or more of several different common termination mechanisms/techniques where the mechanical configuration of the termination mechanisms typically dictates the technique used.

One such termination mechanism/technique is commonly referred to as "side-wire" (or otherwise referred to as "wrap-wire"). To terminate a wire using a side-wire terminal, an end of the wire is initially stripped to expose at least a portion of the end of the wire and then this exposed portion is wrapped around a terminal screw. The terminal screw is then tightened causing the head of the screw to secure the exposed wire between the head of the screw and a metallic plate (e.g., a brass terminal).

Another type of wiring mechanism/technique is referred to as "back-wire" (otherwise also referred to as "clamp-wire"). Typically, in back-wire terminals a screw engages a metallic plate with a second metallic plate (the resulting arrangement forming in a clamp) to compress a wire therebetween. In such a back-wire termination mechanism, a first metallic plate typically has a threaded opening and forms the clamp arrangement with a second metallic plate that has a non-threaded opening sized large enough to allow this second metallic plate to slide along the shaft of the screw between the first metallic plate and the head of the screw. Placing an exposed end of a stripped wire between the two metallic plates and tightening the screw results in the wire being removably secured between the two plates.

Another type of wire terminal mechanism/technique is referred to as "push in." Push-in termination mechanisms typically include a small hole, or aperture, in the wiring device housing through which an exposed end of a stripped wire is inserted and removably secured within the wiring device with the cooperation of a retention mechanism. For example, an end of a solid wire is initially stripped to expose about five-eighths of an inch of the wire. The resultant exposed portion of the wire is then inserted through the hole and into engagement with the internal retention mechanism which removably secures the exposed end of the wire by, e.g., applying clamping pressure to the wire in order to maintain the wire in electrical contact with an internal conductive portion of the wiring device. The retention mechanism provides sufficient resistance to prevent the wire from being pulled out of the hole. Typically, to release the wire, a tool (e.g., a screwdriver) is used to engage a releasing mechanism to release the wire.

Wiring devices usually also include a ground terminal that typically uses a wrap-wire/side-wire arrangement, as described above; e.g., a metallic plate that includes a threaded opening for receiving a ground terminal screw. Grounded wiring devices could also employ a conductive strap, or frame, which may be used in conjunction with a ground terminal screw for grounding the device. Wiring devices that use such a ground terminal screw in a side-wire/wrap-wire configuration would be wired as discussed above using an exposed portion of the ground wire.

Other examples of wire terminals utilize quick connect mechanisms. For example, the quick connect wire terminals may incorporate levers and springs (e.g., a main spring or a clamp spring) to selectively secure the electrical wire within the wiring device (e.g., the wire terminals are arranged and configured to mechanically and electrically secure an electrical wire to an electrical terminal or contact). Examples of such wire terminals are disclosed in U.S. Pat. No. 11,791,573, issued on Oct. 17, 2023, entitled "Wire Terminals and Methods of Uses," U.S. patent application Ser. No. 18/036,060, filed on May 9, 2023, entitled "Wire Terminals and Methods of Uses," U.S. patent application Ser. No. 18/036,509, filed on May 11, 2023, entitled "Wire Terminals and Methods of Uses," and U.S. Provisional Patent Application No. 63/461,945, filed on Apr. 26, 2023, entitled "Wire Terminals," the contents of each application incorporated by reference herein in its entirety.

However, some wiring devices such as, for example, electrical receptacles incorporating a wrap-around strap and three-way switches, require special considerations when incorporating lever-based wire terminals.

It is with this in mind that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In some embodiments, an electrical receptacle is disclosed. The electrical receptacle including a housing, an electrical terminal disposed at least partially within the housing, and a plurality of wire terminals arranged and configured to mechanically and electrically secure a line-voltage AC electrical wire to the electrical terminal. The wire terminals may include an actuator moveable between a first position and a second position and a spring clamp including an opening, the opening at least partially defining an electrical wire receiving space configured to receive the electrical wire. In the second position, the actuator manipulates the spring clamp to enlarge the electrical wire receiving space to receive the electrical wire. In the first position, the actuator allows the spring clamp to return to an initial configuration, the initial configuration arranged and configured to reduce the electrical wire receiving space, wherein if an electrical wire is present, the electrical wire is biased into contact with the electrical terminal to securely retain the electrical wire within the electrical wire receiving space and in contact with the electrical terminal.

The electrical receptacle further including an electrical strap including a rear portion arranged and configured to contact a rear surface of the housing, a top portion extending from a first end of the rear portion and arranged and configured to contact a top portion of the housing, a bottom portion extending from a second end of the rear portion and arranged and configured to contact a bottom portion of the housing, and a ground tab arranged and configured to electrically contact a ground wire during use. The housing including a ground tab opening formed in the rear surface of the housing, the ground tab opening arranged and configured to receive the ground tab.

In some embodiments, the ground tab is positioned within the ground tab opening via the rear surface of the housing and the spring clamp is positioned within the housing via a front surface thereof.

In some embodiments, the ground tab extends from the bottom portion of the electrical strap.

In some embodiments, the electrical strap and the ground tab are monolithically formed in one piece.

In some embodiments, the housing further includes a plurality of openings formed in a rear surface thereof to receive a plurality of electrical wires, respectively, coupled to line voltage therein.

In some embodiments, the spring clamp includes a first leg arranged and configured to contact the electrical terminal, a second leg having a first end extending from an end of the first leg, and a third leg extending from a second end of the second leg, the third leg including the opening, the opening defining an inner surface arranged and configured to contact the electrical wire when in the first position, wherein the third leg includes a first end and a second end, the first end extending from the second end of the second leg, the second end including the inner surface and a groove extending from the inner surface to the second end thereof.

In some embodiments, the spring clamp includes a plurality of legs, wherein one of the plurality of legs includes a first end, a second end, and the opening, the opening defining an inner surface arranged and configured to contact the electrical wire when in the first position, and a groove extending from the inner surface to the second end thereof.

In some embodiments, the groove includes a V-shaped groove.

In some embodiments, the second end of the leg is angled relative to the first end of the leg.

In some embodiments, the second end of the leg includes an angled end portion that projects away from an insertion direction of the electrical wire when the electrical wire is being received within the electrical wire receiving space.

In some embodiments, the second end of the leg includes an angled end portion that projects towards an insertion direction of the electrical wire when the electrical wire is being received within the electrical wire receiving space.

An electrical switch is also disclosed. The electrical switch including a housing, a user accessible actuator extending from the housing, the user accessible actuator moveable between a first position and a second position, and an electrical terminal positioned at least partially within the housing. The electrical terminal including a brush arm including a first end and a second end, a first common contact arranged and configured in electrical contact with the first end of the brush arm, a second common contact arranged and configured in electrical contact with the first end of the brush arm, a first traveler contact, and a second traveler contact. In use, movement of the user accessible actuator to the first position moves the second end of the brush arm into contact with one of the first and second traveler contacts. Movement of the user accessible actuator to the second position moves the second end of the brush arm into contact with the other one of the first and second traveler contacts.

In some embodiments, the second end of the brush arm includes a contact having first and second contact portions, the first traveler including a first contact configured to selectively contact one of the first and second contact portions, and the second traveler includes a second contact configured to selectively contact the other side of the first and second contact portions.

In some embodiments, the contact of the brush arm is a double-sided contact wherein the first contact portion is one side of the double-sided contact and the second contact portion is the other side of the double-sided contact.

In some embodiments, the electrical switch further includes a plurality of wire terminals positioned at least partially within the housing, the wire terminals arranged and configured to mechanically and electrically secure a line-voltage AC electrical wire to the electrical terminal. The wire terminals including an actuator moveable between a first position and a second position and a spring clamp including an opening, the opening at least partially defining an electrical wire receiving space configured to receive the electrical wire. In the second position, the actuator manipulates the spring clamp to enlarge the electrical wire receiving space to receive the electrical wire. In the first position, the actuator allows the spring clamp to return to an initial configuration, the initial configuration arranged and configured to reduce the electrical wire receiving space, wherein if an electrical wire is present, the electrical wire is biased into contact with the electrical terminal to securely retain the electrical wire within the electrical wire receiving space and in contact with the electrical terminal.

In some embodiments, the spring clamp includes a first leg arranged and configured to contact the electrical terminal, a second leg having a first end extending from an end of the first leg, and a third leg extending from a second end of the second leg, the third leg including the opening, the opening defining an inner surface arranged and configured to contact the electrical wire when in the first position, wherein the third leg includes a first end and a second end, the first end extending from the second end of the second leg, the second end including the inner surface and a groove extending from the inner surface to the second end thereof.

In some embodiments, the groove comprises a V-shaped groove.

In some embodiments, the second end of the third leg is angled relative to the first end of the third leg.

An improved spring clamp is also disclosed. In use, the spring clamp is arranged and configured to be used in a wire termination mechanism in an electrical wiring device. The spring clamp includes a first leg arranged and configured to contact an electrical terminal positioned within the electrical wiring device, a second leg having a first end extending from an end of the first leg, the second leg being arranged and configured to interact with an actuator to enable the spring clamp to transition between a first position and a second position, and a third leg extending from a second end of the second leg. The third leg includes an opening arranged and configured to receive a portion of an electrical wire therein and a portion of the electrical terminal, the opening defining an inner edge arranged and configured to contact an electrical wire. The third leg includes a first end and a second end, the first end extending from the second end of the second leg, the second end including the inner edge and a groove extending from the inner edge to the second end thereof.

In some embodiments, the groove comprises a V-shaped groove.

In some embodiments, the second end of the third leg is angled relative to the first end of the third leg.

BRIEF DESCRIPTION OF THE DRAWINGS

By way of example, a specific embodiment of the disclosed device will now be described, with reference to the accompanying drawings, in which.

Figure 1A:
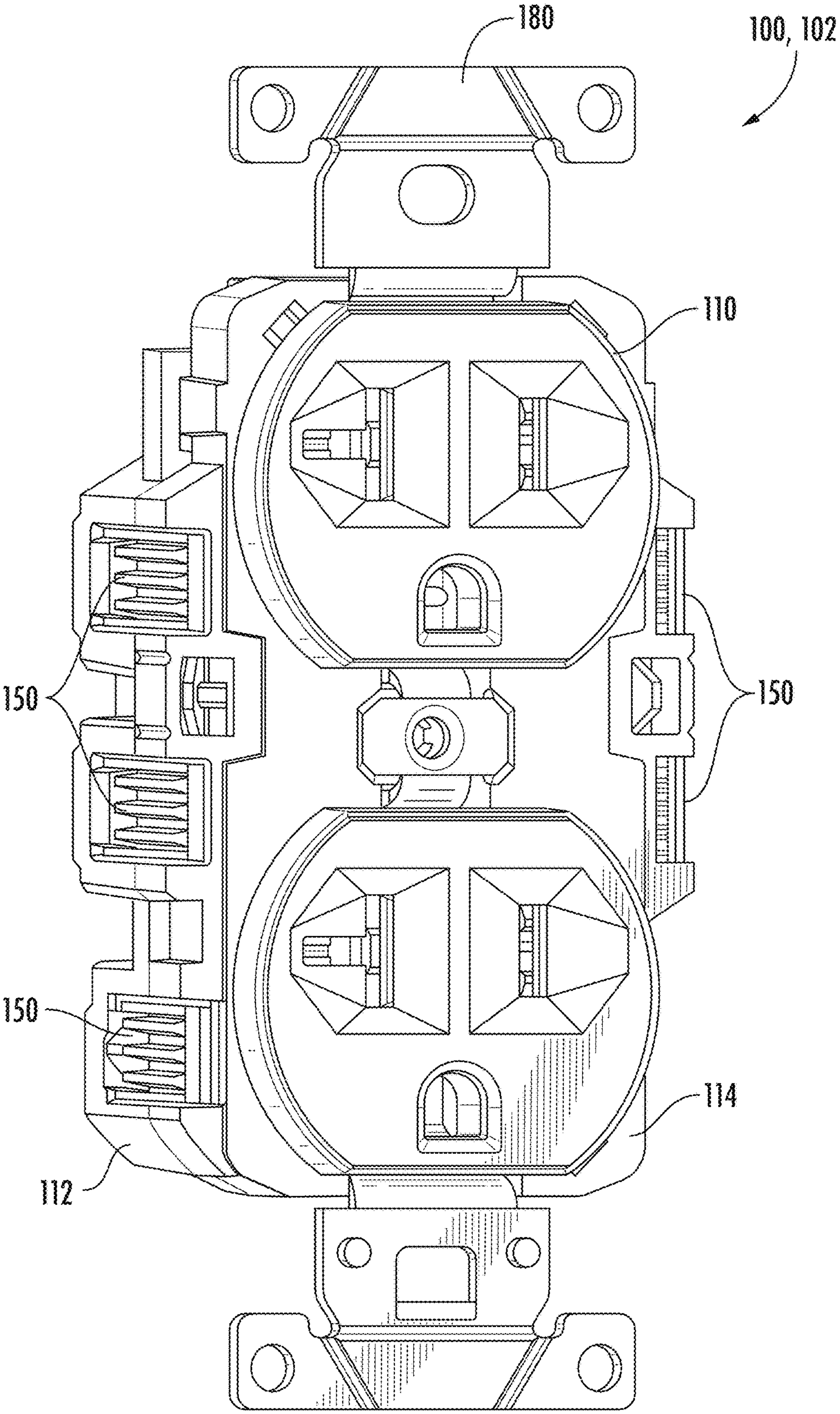
FIG. 1A illustrates a front perspective view of an embodiment of a wiring device in accordance with one or more features of the present disclosure, the wiring device including a wrap-around electrical strap, a housing, and wire terminals in accordance with one or more features of the present disclosure.
Figure 1B:
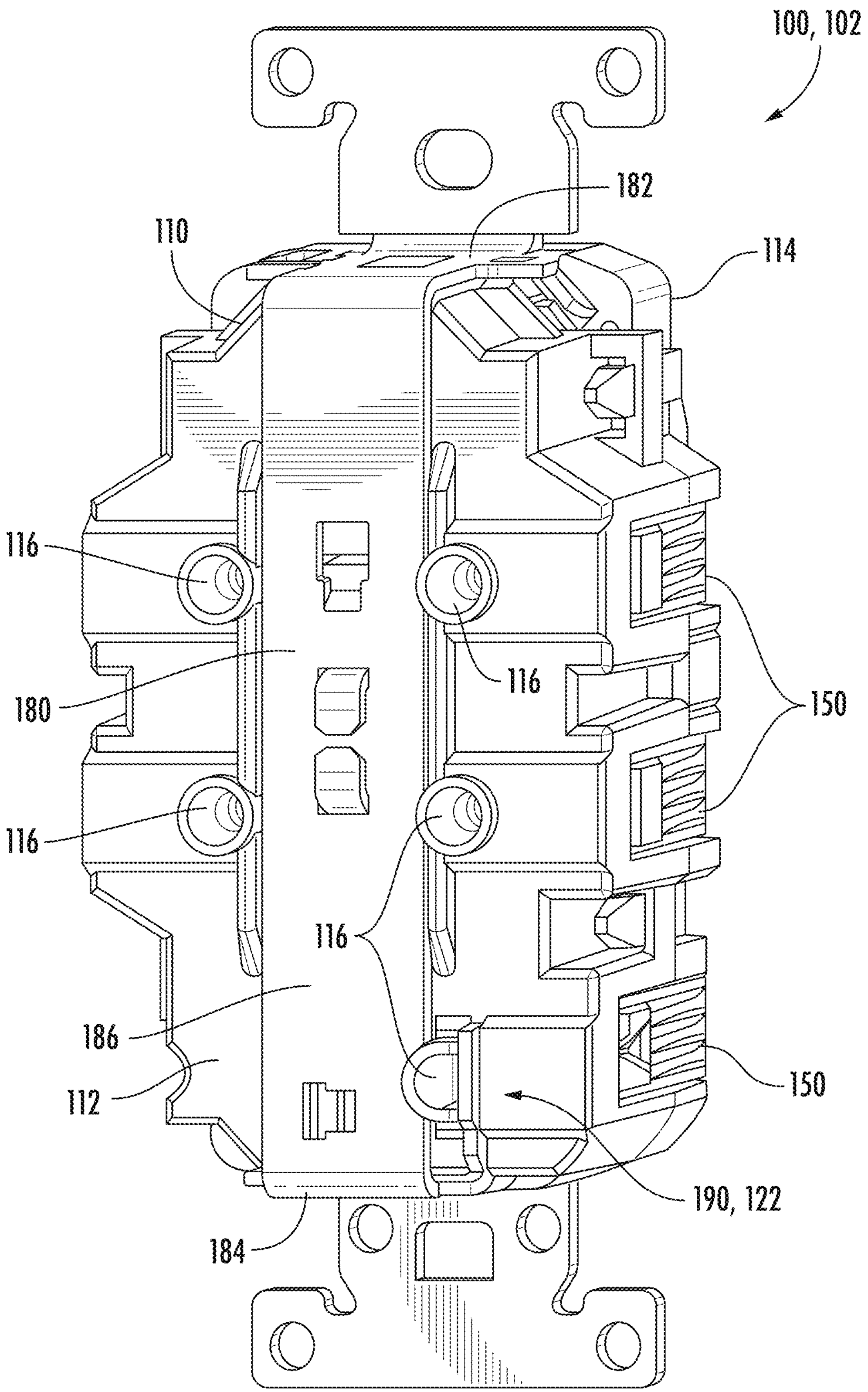
FIG. 1B illustrates a rear perspective view of the wiring device of FIG. 1A.
Figure 1C:
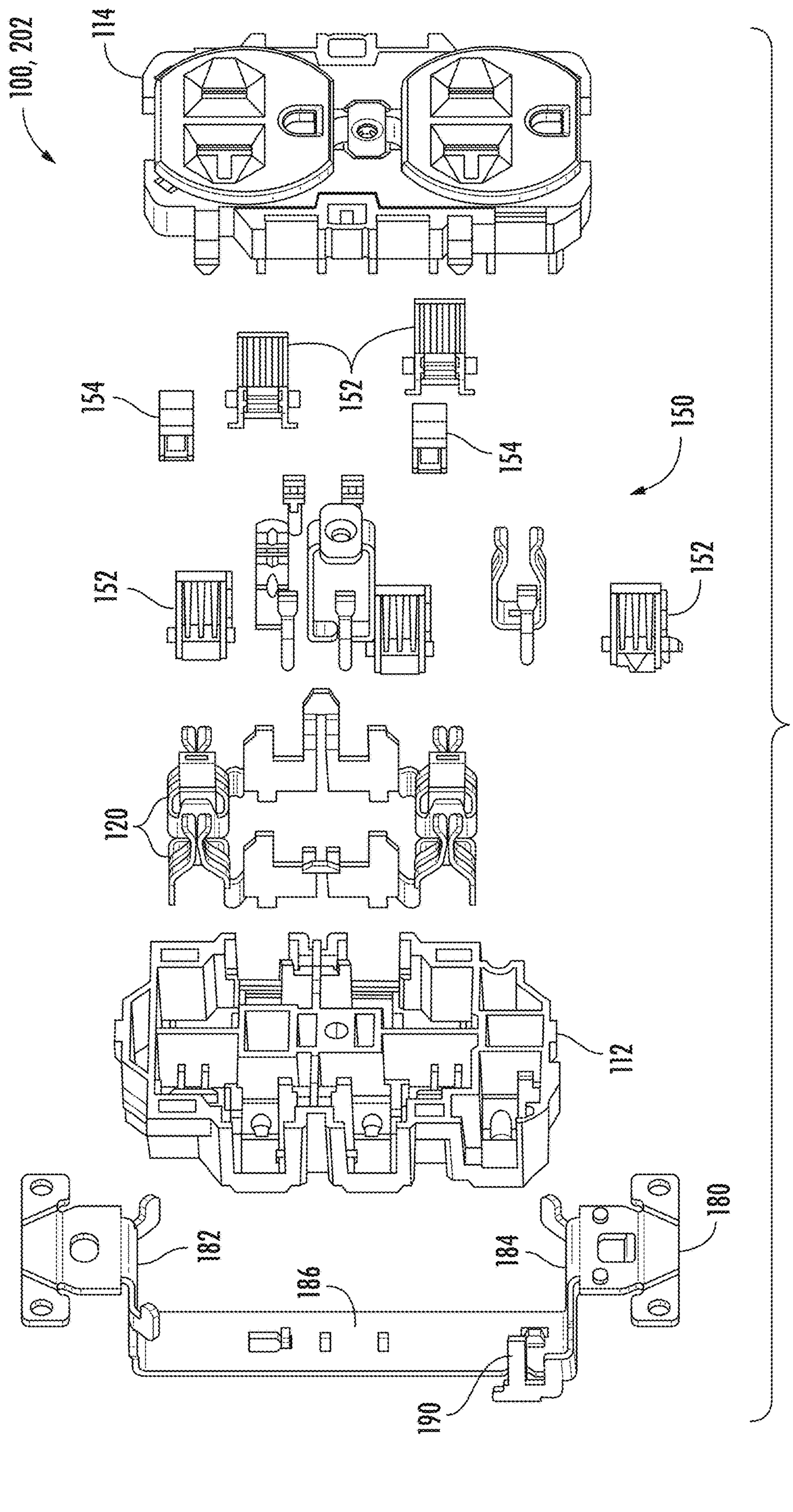
FIG. 1C illustrates an exploded view of the wiring device of FIG. 1A.
Figure 1D:
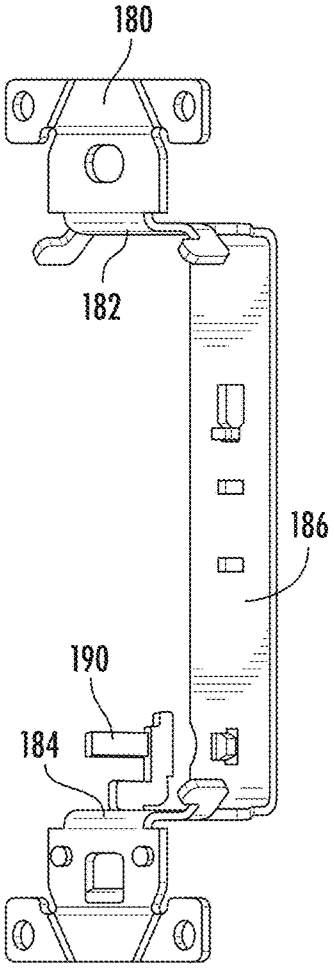
FIG. 1D illustrates a perspective view of the wrap-around strap used in the wiring device of FIG. 1A.
Figure 1E:
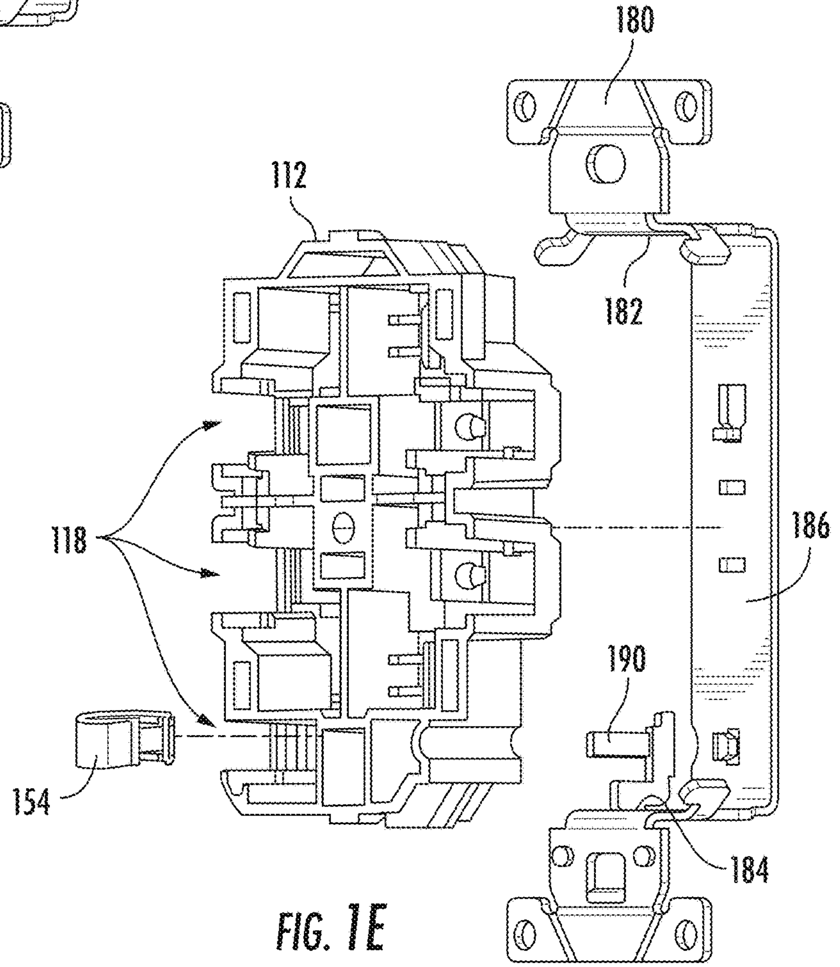
FIG. 1E illustrates an exploded view of the wrap-around electrical strap, the housing, and the wire terminal (e.g., spring clamp)
Figure 1F:
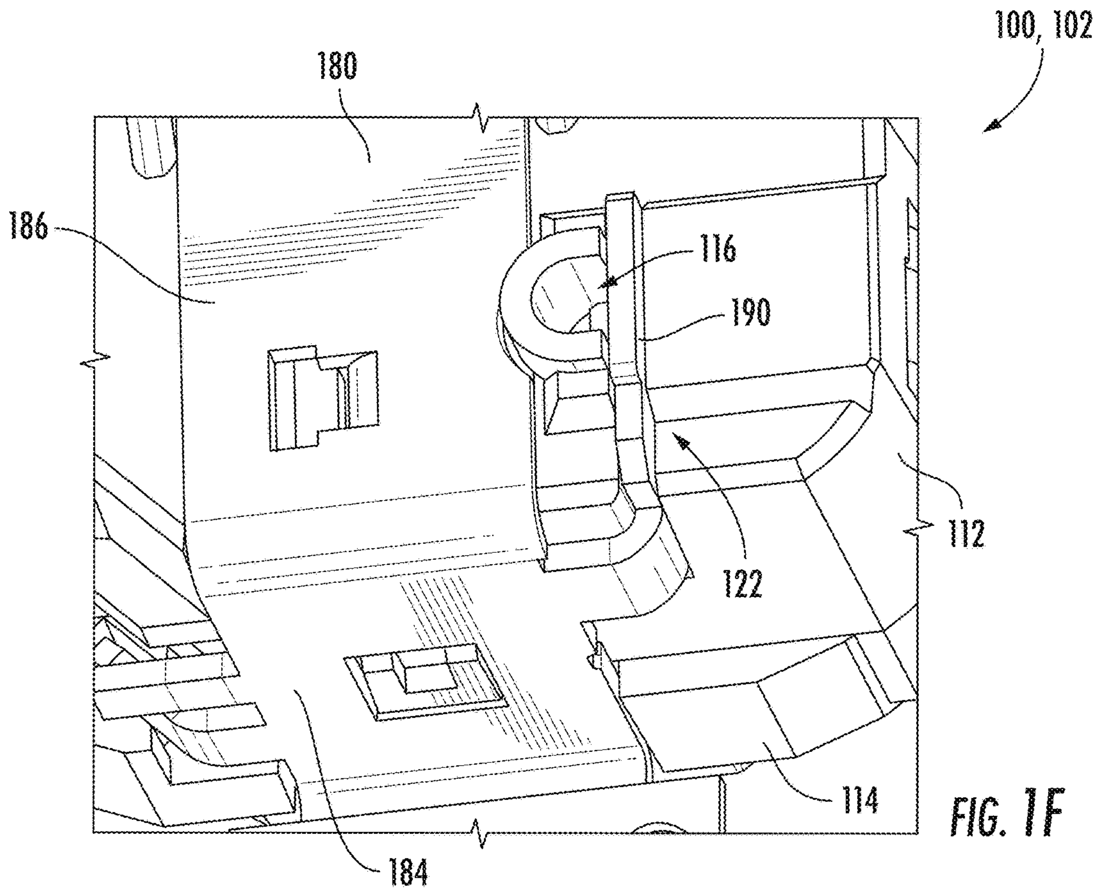
FIG. 1F illustrates a rear detailed view of the wiring device of FIG. 1A.
Figure 1G:
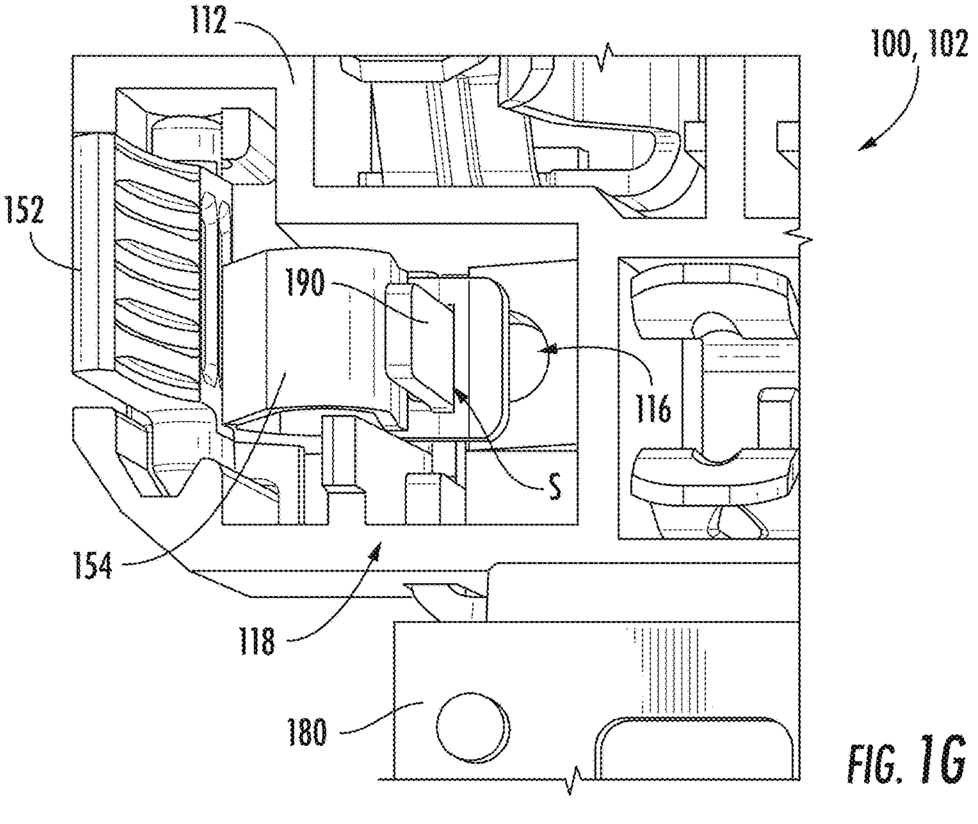
FIG. 1G illustrates a front detailed view of the wiring device of FIG. 1A, parts of the wiring device removed.
Figure 1H:
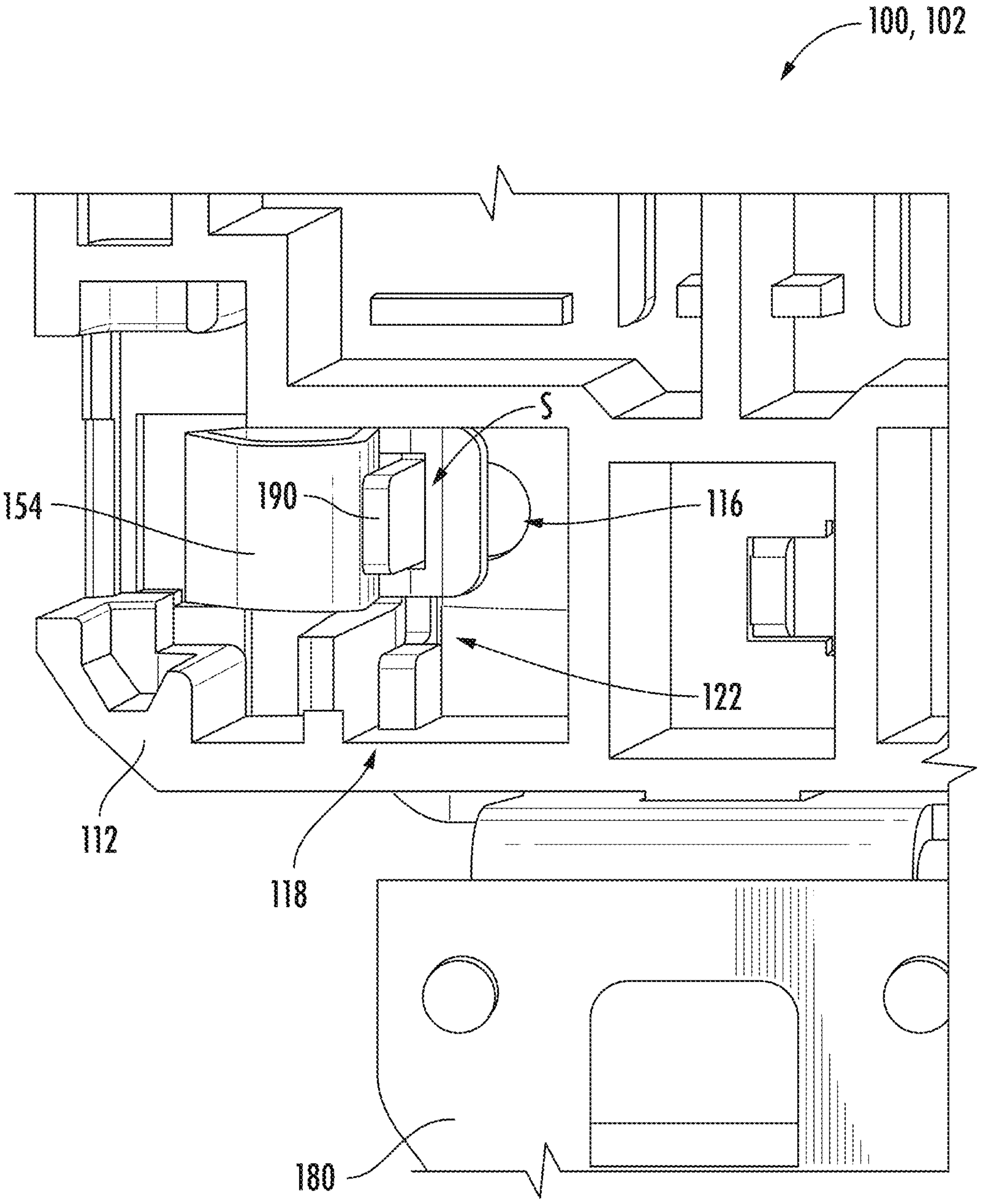
FIG. 1H illustrates an alternate front detailed view of the wiring device of FIG. 1A, parts of the wiring device removed.

It should be understood that the drawings are not necessarily to scale and that the disclosed embodiments are sometimes illustrated diagrammatically and in partial views. In certain instances, details which are not necessary for an understanding of the disclosed methods and devices or which render other details difficult to perceive may have been omitted. It should be further understood that this disclosure is not limited to the particular embodiments illustrated herein. In the drawings, like numbers refer to like elements throughout unless otherwise noted.

DETAILED DESCRIPTION

Various features or the like of wiring devices incorporating wire terminals or wire termination mechanisms (terms used interchangeably herein without the intent to limit or distinguish) and corresponding methods of assembly will now be described more fully hereinafter with reference to the accompanying drawings, in which one or more features of the wiring devices and/or wire terminals will be shown and described. It should be appreciated that the various features may be used independently of, or in combination, with each other. It will be appreciated that the various wiring devices and/or wire terminals as disclosed herein may be embodied in many different forms and should not be construed as being limited to the embodiments set forth herein. Rather, these embodiments are provided so that this disclosure will convey certain features of the wiring device and/or wire terminals to those skilled in the art.

In accordance with one or more features of the present disclosure, various electrical wiring devices incorporating wire terminals arranged and configured to enable an installer to quickly and easily install, secure, engage, couple, etc. (terms used interchangeably herein without the intent to limit or distinguish) one or more electrical wires to the electrical wiring device will be shown and described. As will be described herein, the wire terminal may utilize a main spring, a spring clip, a spring clamp, a cage clamp, etc. (terms used interchangeably herein without the intent to limit or distinguish) and an actuator such as, for example, a lever. In use, movement of the lever manipulates the spring clamp between first and second positions to displace portions of the spring clamp a certain distance to accept an electrical wire and to secure the electrical wire against an electrical terminal positioned within the wiring device. That is, in use, the wire terminal (e.g., actuator and spring clamp) is used to selectively couple the electrical wire to the wiring device (e.g., the wire terminals are arranged and configured to mechanically and electrically secure an electrical wire to an electrical terminal (e.g., a wire termination surface of an electrical terminal)).

Referring to FIGS. 1A-1H, in accordance with one or more features of the present disclosure, an example embodiment of a wiring device 100 is shown. As illustrated, the wiring device 100 may be a commercial or industrial-grade electrical receptacle 102 as is commonly known in the art. The wiring device 100 includes a housing 110 including first (e.g., rear) and second (e.g., front) housing portions 112, 114, that, when assembled, enclose a variety of components, although the housing 110 may include more or less portions. In addition, as will be readily appreciated by one of ordinary skill in the art, the wiring device 100 includes electrical terminals or contacts 120 (terms used interchangeably herein without the intent to limit or distinguish) positioned therein. The wiring device 100 also includes wire terminals 150 arranged and configured to couple an electrical wire to the electrical terminals 120. Moreover, the wiring device 100 includes an electrical strap 180 and specifically a wrap-around strap that wraps or surrounds the first or rear housing portion 112. As will be appreciated, in use, the wiring device 100 is normally fastened to an electrical box in walls and ceilings of buildings or in other suitable locations. For example, the wiring device 100 is sized and configured as a single gang wall box mounted device.

As illustrated, the wiring device 100 includes a plurality of openings 116 formed in the first or rear housing portion 112 of the housing 110 (referred to herein as a housing opening) to receive an electrical wire coupled to line voltage. For example, as illustrated, in some embodiments, the housing 110 may include five housing openings 116 formed in a rear surface thereof, although this is but one configuration and more or less openings may be included. In use, the electrical terminals 120 are substantially aligned with the housing openings 116. The electrical terminals 120 include a wire termination surface for contacting the electrical wire inserted into the housing 110 via the housing opening 116 and an opposing mounting surface. In addition, as previously mentioned, the housing 110 also includes a plurality of wire terminals 150. In use, the housing 110 and more specifically, the first or rear housing portion 112, includes one or more pockets 118 arranged and configured to receive the electrical terminals 120, the wire terminals 150 including, for example, the actuator (e.g., lever) 152 and the spring clamp 154 (as will be described in greater detail below), and any other components. In use, the pockets 118 are arranged and configured to receive, seat, etc. the wire terminals 150 including the actuator (e.g., lever) 152 and the spring clamp 154, the electrical terminals 120, etc. In use, the pockets 118 receiving the actuator 152 are arranged and configured to enable the actuator 152 to move (e.g., pivot) between first and second positions for reasons described below.

An example embodiment of a wire terminal 150 in accordance with one or more features of the present disclosure will now be described. As will be appreciated by one of ordinary skill in the art, the wire terminal 150 is arranged and configured to be incorporated into a wiring device such as, for example, wiring device 100. However, while a specific embodiment of a wire terminal 150 including the actuator (e.g., lever) 152 and the spring clamp 154 will now be described, it should be appreciated that any suitable wire terminal mechanism now known or hereafter developed may be used.

As illustrated, in some embodiments, the wire terminal 150 includes an actuator 152 such as, for example, a lever, and a spring clamp 154. In use, the actuator 152 is moveably positioned within the housing 110 of the wiring device 100. For example, the actuator 152 may be provided in the form of a lever, which is pivotably positioned within the housing 110 of the wiring device 100. In addition, as will be described in greater detail herein, in use, the actuator 152 is arranged and configured to contact, interact with, etc., the spring clamp 154 so that, in use, movement of the actuator 152 manipulates (e.g., moves, etc.) the spring clamp 154 between first and second positions.

That is, in some embodiments, the actuator 152 is arranged at least partially within the housing 110 and is configured to be moveable by an end user about a pivot axis between first and second positions. In use, the actuator 152 is moveable (e.g., pivotable) between a first (e.g., closed) position and a second (e.g., opened) position. During installation, with the actuator 152 in the second position (e.g., with the actuator 152 in contact with the spring clamp 154), a user may insert an electrical wire into an electrical wire receiving space S (FIGS. 1G and 1H) (e.g., defined by the opening in the spring clamp and the portion of the electrical terminal positioned therein). Thereafter, once the electrical wire has been inserted, the user may rotate the actuator 152 to the first position to retain the wire within the wire terminal 150 and in contact with the electrical terminal 120 (e.g., with the wire termination surface of the electrical terminal 120).

Thus arranged, in some embodiments, with the actuator 152 in the second position, the actuator 152 manipulates, moves, etc. the spring clamp 154 (e.g., a leg (e.g., second leg) of the spring clamp 154 to manipulate (e.g., move) the spring clamp 154, or a portion thereof, relative to the electrical terminal 120 to enlarge or increase the size of the electrical wire receiving space S so that the user can insert the electrical wire into the electrical wire receiving space S and the opening formed in the spring clamp 154. Thereafter, with the electrical wire inserted into the electrical wire receiving space S and within the opening formed in the spring clamp 154, the user moves the actuator 152 to the first position so that the spring clamp 154 returns towards its initial or relaxed position. That is, in the first position, the actuator 152 releases, or at least minimizes the contact force on the spring clamp 154, so that the actuator 152 no longer contacts, or reduces its contact, with the spring clamp 154 so that the spring clamp 154 is in a relaxed state whereby the spring clamp 154 applies a supplemental force to retain the electrical wire within the electrical wire receiving space S, within the opening formed in the spring clamp 154, and to ensure that the electrical wire remains in contact with the electrical terminal 120 of the wiring device 100.

Thus arranged, in use, the actuator 152 may be moved from the first position to the second position, or may be provided in the second position. In either event, with the actuator 152 in the second position, the actuator 152 contacts and manipulates the spring clamp 154 to create or enlarge the electrical wire receiving space S to enable a user to insert the electrical wire into the wire terminal 150 (e.g., in the second position, the electrical wire receiving space S may be enlarged a sufficient amount so that the electrical wire can be freely inserted into the electrical wire receiving space S without interference or resistance). In some embodiments, the spring clamp 154, or at least a portion thereof, may be moved away from the electrical terminal 120 thereby creating or enlarging the electrical wire receiving space S for the electrical wire to be inserted when the actuator 152 is in the second position.

Once the wire is installed into the electrical wire receiving space S, the actuator 152 may be moved to the first position. In the first position, the spring clamp 154 is arranged and configured to apply a supplemental force to retain the wire within the electrical wire receiving space S and to ensure that the wire remains in contact with the electrical terminal 120 of the wiring device 100. That is, in the first position, the spring clamp 154 is arranged and configured to provide an increased retention force to maintain the electrical wire within the electrical wire receiving space S (e.g., the spring clamp 154 is arranged and configured to press against the installed electrical wire sandwiching, or compressing, the wire between a leg or edge surface of the spring clamp 154 and the electrical terminal 120.

Additional information on wire terminals providing quick connect mechanisms is provided in U.S. Pat. No. 11,791,573, issued on Oct. 17, 2023, entitled "Wire Terminals and Methods of Uses;" U.S. patent application Ser. No. 18/036,060, filed on May 9, 2023, entitled "Wire Terminals and Methods of Uses;" U.S. patent application Ser. No. 18/036,509, filed on May 11, 2023, entitled "Wire Terminals and Methods of Uses;" and U.S. Provisional Patent Application No. 63/461,945, filed on Apr. 26, 2023, entitled "Wire Terminals," the contents of each application incorporated by reference herein in its entirety.

However, incorporating quick connect wire terminals into commercial or industrial grade electrical receptacles utilizing a wrap-around strap has been challenging. That is, coupling a quick connect wire terminal to the ground contact of a wrap-around strap has been challenging. In accordance with one or more features of the present disclosure, a novel system and method of assembling an electrical receptacle utilizing a wrap-around electrical strap and wire terminal is provided.

With reference to FIGS. 1A-1H, the wrap-around strap includes a top portion or segment 182, a bottom portion or segment 184, and a rear portion or segment 186. As will be readily appreciated, the strap 180 is arranged and configured to wrap or surround the top, bottom, and rear portions of the housing 110 of the wiring device 100. In addition, the strap 180 is arranged and configured to facilitate coupling to, for example, an electrical box. In accordance with one or more features of the present disclosure, the electrical strap 180 includes a ground tab 190 arranged and configured to electrically contact a ground wire during use. As illustrated, in some embodiments, the ground tab 190 may extend from, be coupled to, etc., the bottom portion or segment 184, although this is but one configuration and the ground tab 190 may be provided in any suitable configuration such as, for example, extending from or coupled to the rear portion or segment 186. As illustrated, in some embodiments, the electrical strap 180 including the ground tab 190 may be integrally or monolithically formed. However, this is but one configuration and it is envisioned that the electrical strap may be manufactured from multiple components or segments, which are then assembled or coupled together.

In use, the housing 110, and in particular, the first or rear housing portion 112, includes a ground tab opening or slot 122 arranged and configured to receive the ground tab 190. Thus arranged, during assembly, the strap 180 may be coupled to the first or rear housing portion 112 of the housing 110 by aligning the ground tab 190 with the ground tab opening or slot 122. Once aligned, the strap 180 may be coupled to the rear surface of the first or rear housing portion 112 of the housing 110 so that the ground tab 190 is inserted into the ground tab opening or slot 122 from the rear side thereof.

Once the strap 180 is coupled to the first or rear housing portion 112 of the housing 110 with the ground tab 190 received within a corresponding pocket 118 of the first or rear housing portion 112, the ground tab 190 extending through the ground tab opening or slot 122, the wire terminal 150 including the actuator 152 and the spring clamp 154 may be inserted into the corresponding pocket 118 so that the spring clamp 154 engages the ground tab 190. In use, the wire terminal 150 including the actuator 152 and the spring clamp 154 is inserted into the first or rear housing portion 112 of the wiring device 100 via the front side thereof, opposite the rear side via which the ground tab 190 is inserted (e.g., ground tab 190 is inserted into the housing 110 from the rear, the spring clamp 154 is inserted from the front, the side opposite the ground tab 190). Thus arranged, a commercial or industrial grade electrical receptacle incorporating both a wrap-around electrical strap and a wire terminal may be quickly and easily assembled.

Referring to FIGS. 2A-2F, in accordance with one or more features of the present disclosure, an example embodiment of a wiring device 200 is shown. As illustrated, the wiring device 200 is a three-way electrical switch 202 as is commonly known in the art. The wiring device 200 includes a housing 210 including first (e.g., rear) and second (e.g., front) housing portions 212, 214, that, when assembled, enclose a variety of components, although the housing 210 may include more or less portions. In addition, as will be readily appreciated by one of ordinary skill in the art, the wiring device 200 includes electrical terminals or contacts 220 positioned therein. The wiring device 200 also includes wire terminals such as, for example, wire terminals 150 (e.g., actuator 152 and spring clamp 154) described above. In addition, the wiring device 200 includes an actuator or switch 275 (referred to herein as a user accessible actuator without the intent to limit or distinguish) as will be readily appreciated by one of ordinary skill in the art for selectively providing power to a connected load, although this is but one configuration and, in use, the user accessible actuator may have any suitable form now known or hereafter developed. The wiring device 200 may also include an electrical strap 280 to fasten the wiring device to an electrical box in walls and ceilings of buildings or in other suitable locations. For example, the wiring device 200 is sized and configured as a single gang wall box mounted device.

As illustrated, the wiring device 200 includes a plurality of openings 216 formed in the first or rear housing portion 212 of the housing 210 (referred to herein as a housing opening) to receive an electrical wire coupled to line voltage. For example, as illustrated, in some embodiments, the housing 210 may include four housing openings formed in a rear surface thereof, although this is but one configuration and more or less openings may be included. In use, the electrical terminals 220 are substantially aligned with the housing openings 216. The electrical terminals 220 include a wire termination surface for contacting the electrical wire inserted into the housing 210 via the housing opening 216 and an opposing mounting surface. In addition, as previously mentioned, the housing 210 may also include a plurality of wire terminals such as, for example, wire terminals 150. In use, the housing 210 and more specifically, the first or rear housing portion 212, includes one or more pockets 216 arranged and configured to receive the electrical terminal 220, the wire terminals 150 including, for example, the actuator (e.g., lever) 152 and the spring clamp 154, and any other components. In use, the pockets 216 are arranged and configured to receive, seat, etc. the wire terminals 150 including the actuator (e.g., lever) 152 and the spring clamp 154, the electrical terminals 220, etc. In use, the pockets 216 receiving the actuator 152 are arranged and configured to enable the actuator 152 to move (e.g., pivot) between first and second positions for reasons described herein.

In accordance with one or more features of the present disclosure, an example embodiment of an electrical terminal 220 arranged and configured to operate in a three-way switch configuration will now be described. As will be appreciated by one of ordinary skill in the art, the electrical terminal 220 is arranged and configured to be incorporated into a wiring device such as, for example, wiring device 200. In use, the electrical terminal assembly provides for simplified assembly and/or operation by reducing the number of components typically associated with a three-way switch.

Figure 2A:
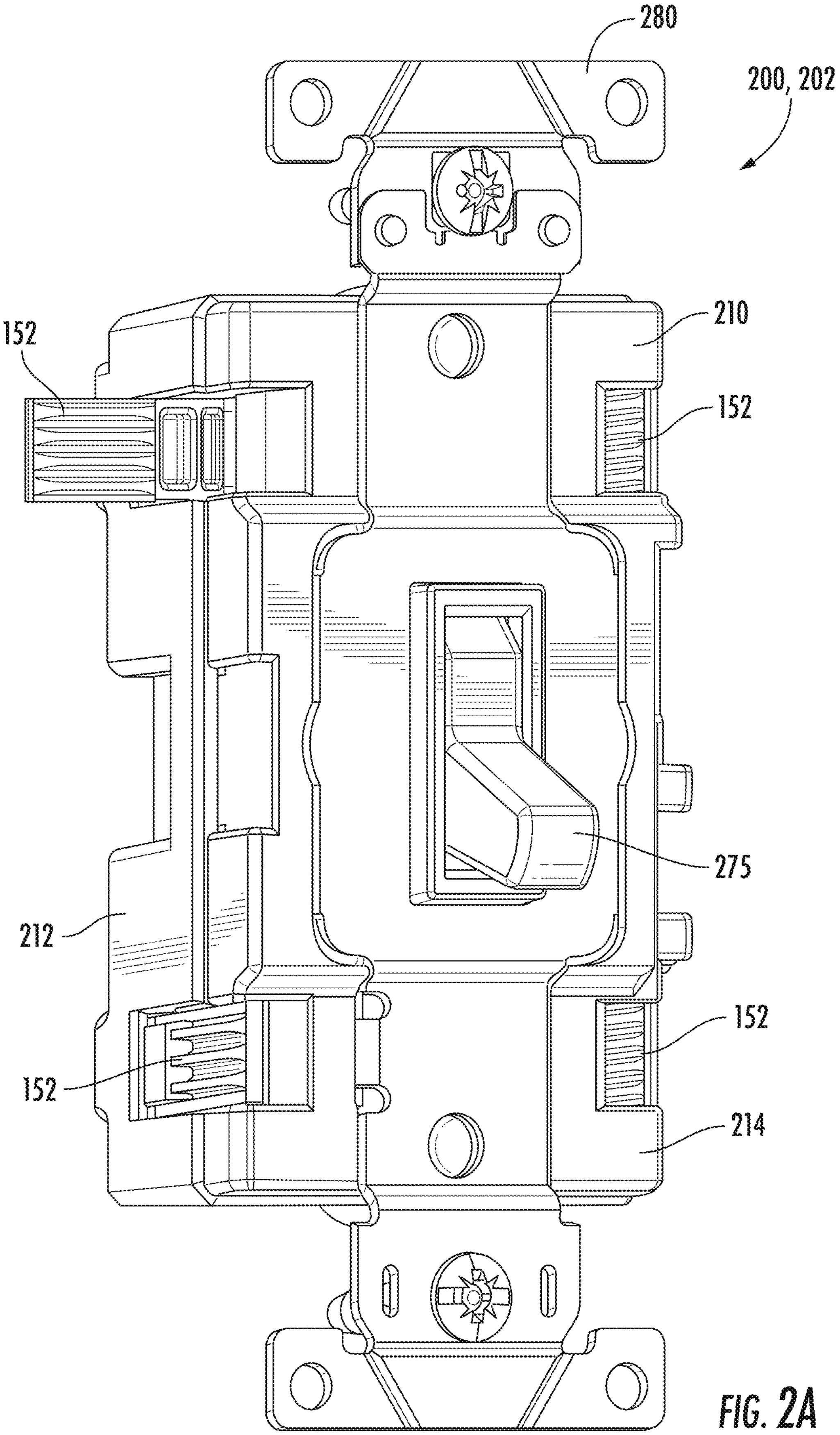
FIG. 2A illustrates a front perspective view of an alternate embodiment of a wire device in accordance with one or more features of the present disclosure.
Figure 2B:
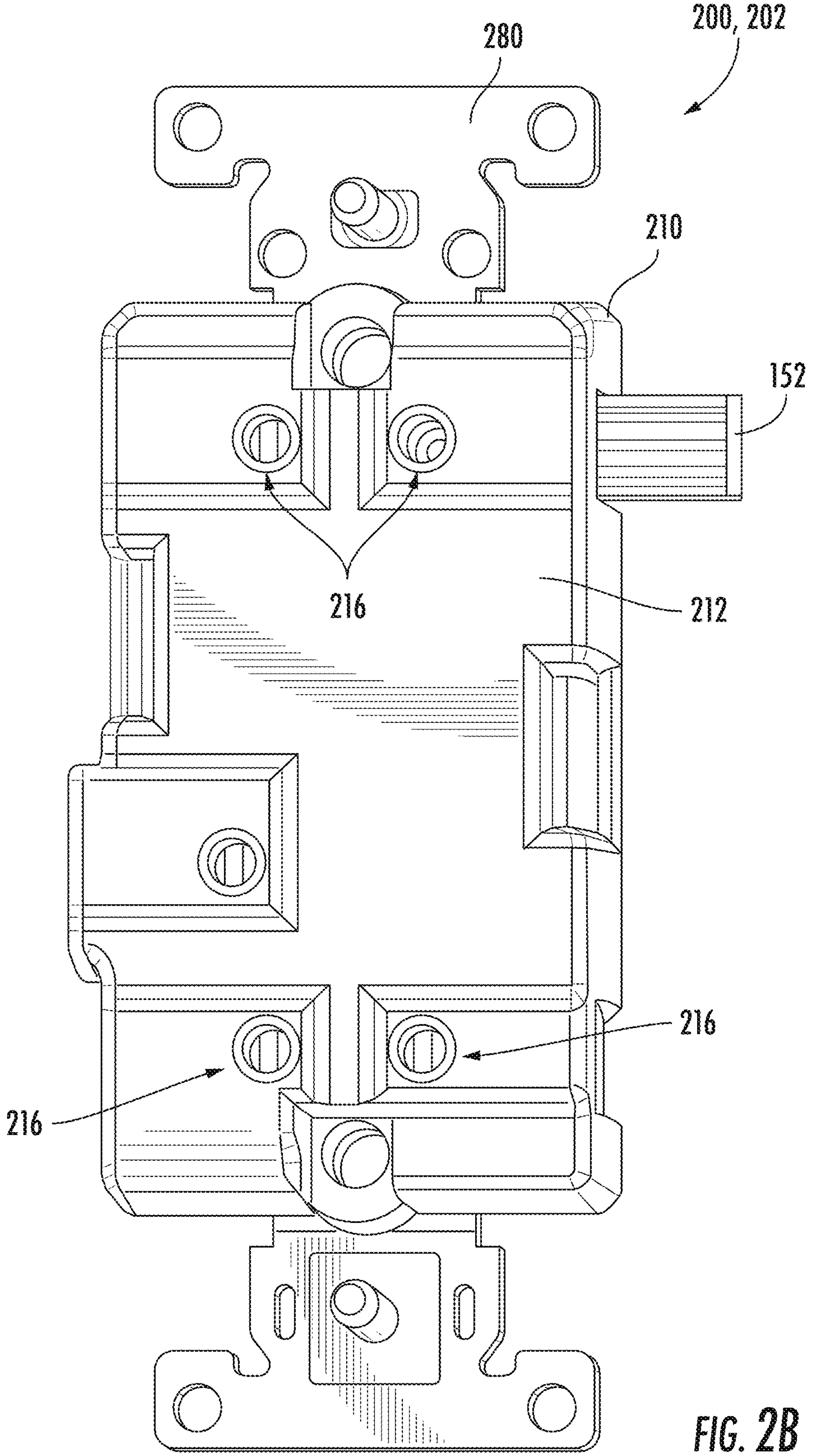
FIG. 2B illustrates a rear perspective view of the wiring device of FIG. 2A.
Figure 2C:
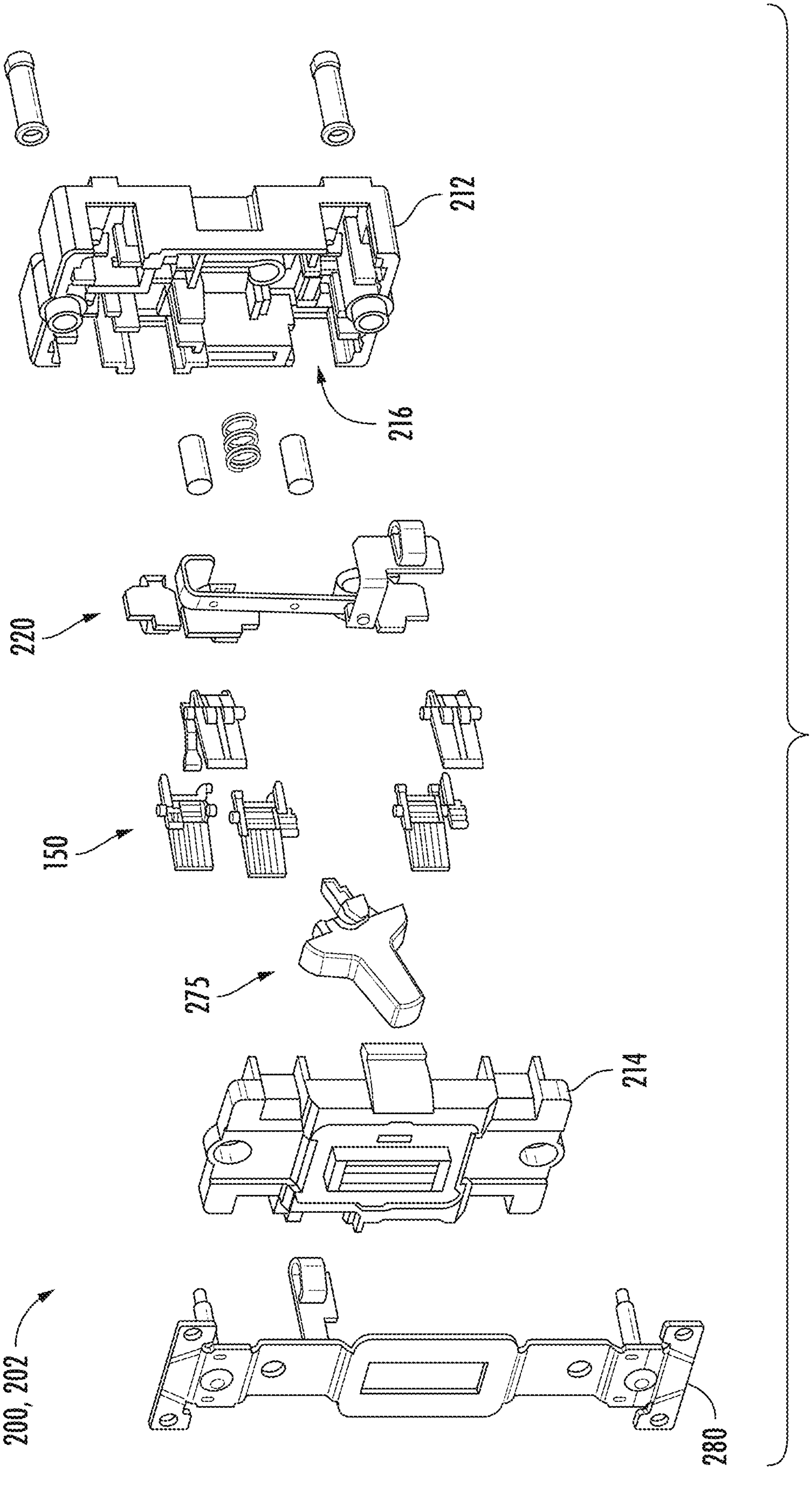
FIG. 2C illustrates an exploded view of the wiring device of FIG. 2A.
Figure 2D:
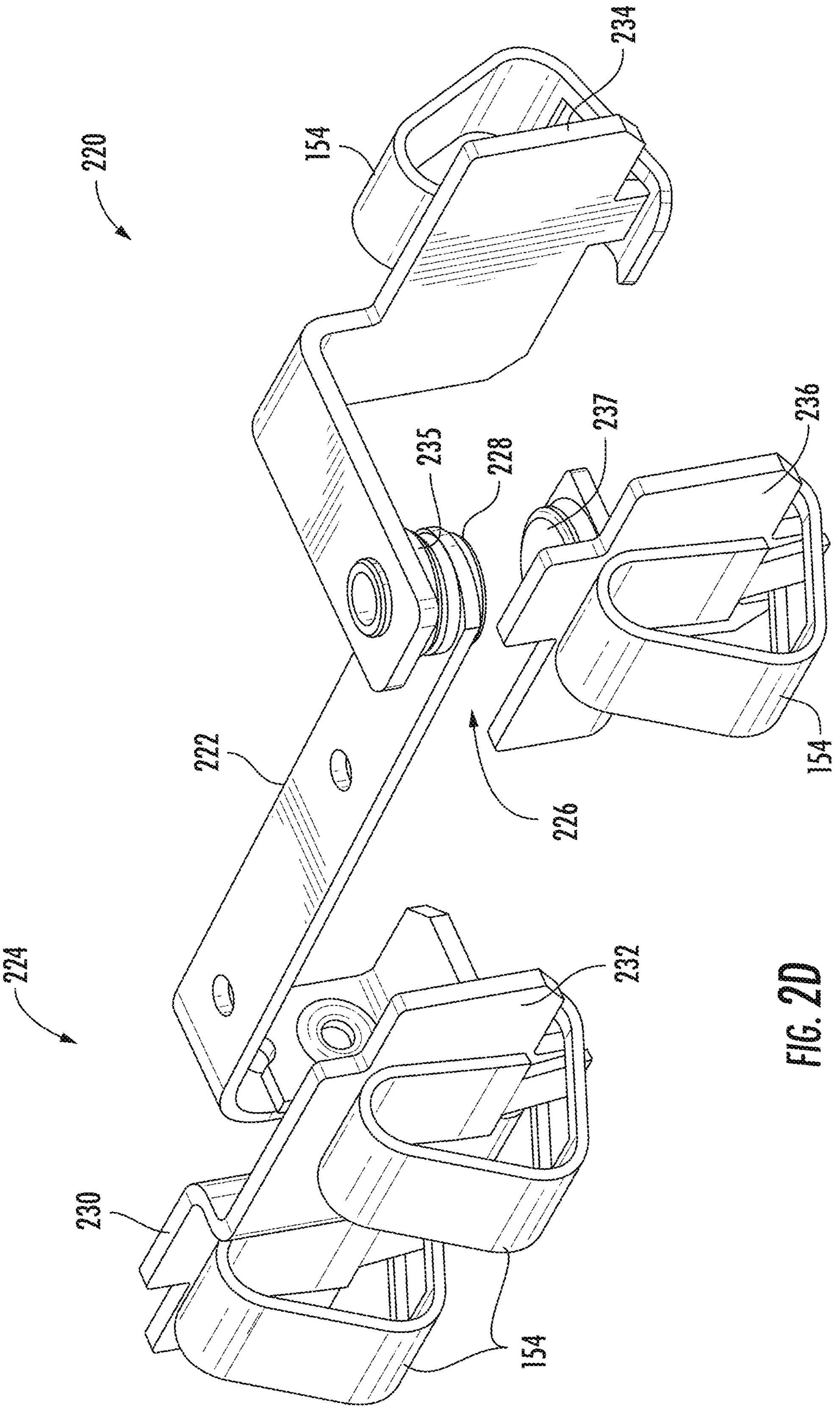
FIG. 2D illustrates a perspective view of an embodiment of an electrical contact in accordance with one or more features of the present disclosure, the electrical contact used in the wiring device of FIG. 2A.
Figure 2E:
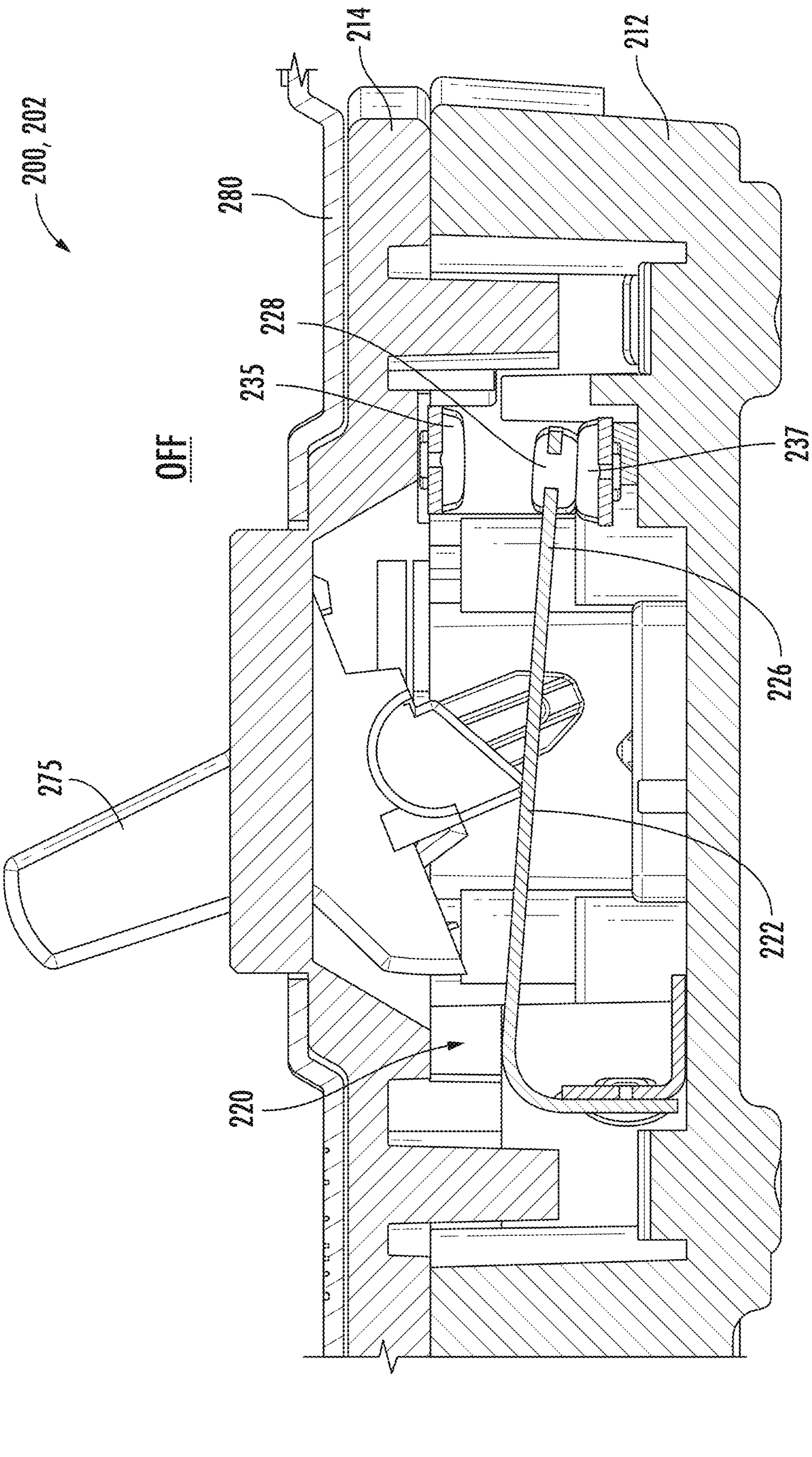
FIG. 2E illustrates a side cross-sectional view of the wiring device of FIG. 2A, the wiring device illustrated in a first or OFF position.
Figure 2F:
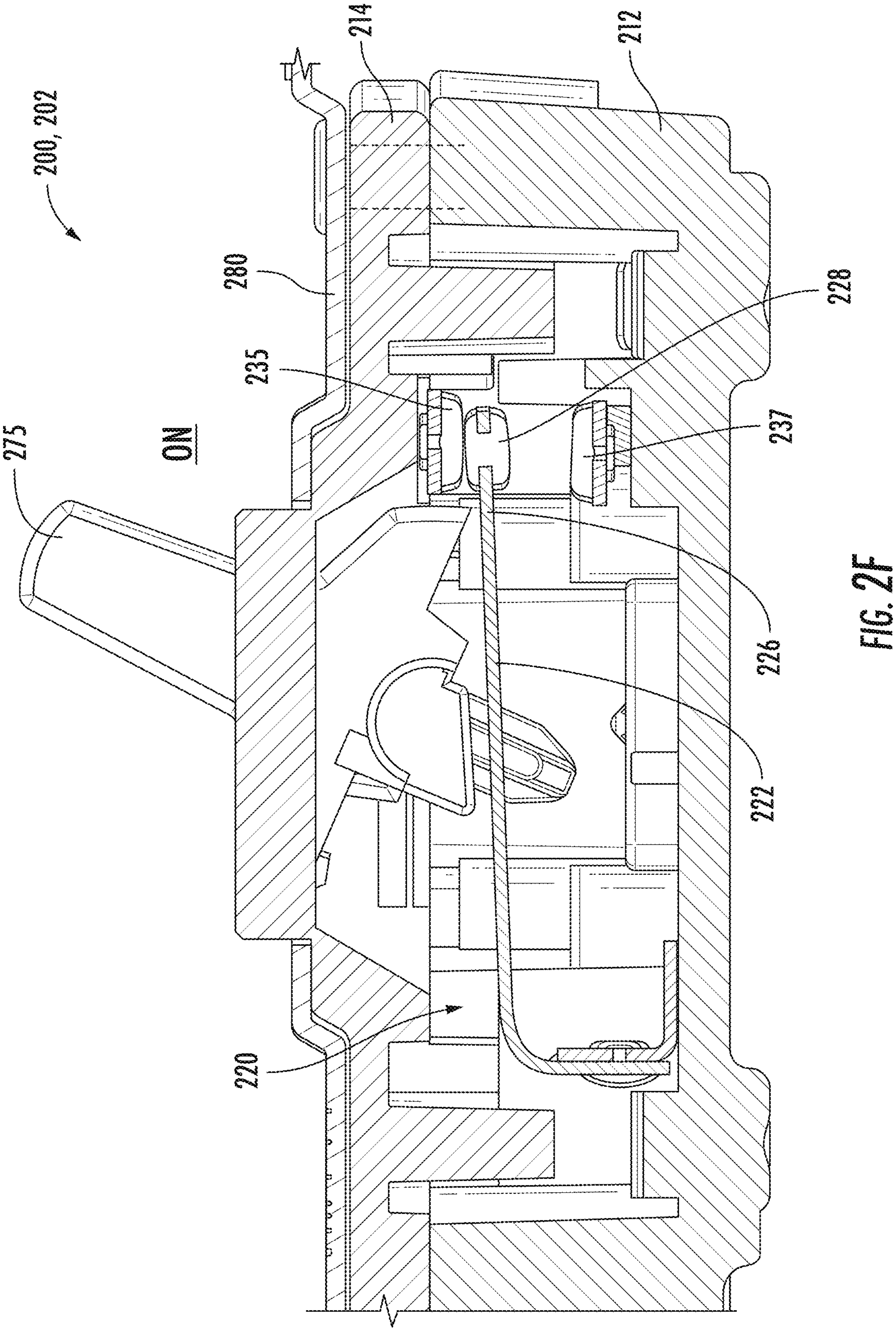
FIG. 2F illustrates a side cross-sectional view of the wiring device of FIG. 2A, the wiring device illustrated in a second or ON position.

With reference to FIG. 2D, in accordance with one or more features of the present disclosure, the electrical terminal 220 includes a brush arm 222 including a first end 224 and a second end 226. In addition, as illustrated, the electrical terminal 220 includes a first common contact 230, a second common contact 232, a first traveler contact 234, and a second traveler contact 236. As will be appreciated by one of ordinary skill in the art, the first and second common contacts 230, 232 are arranged and configured to be in constant contact with the brush arm 222. For example, the first and second common contacts 230, 232 are arranged and configured to be in electrical contact with the first end 224 of the brush arm 222. Meanwhile, in use, the second end 226 of the brush arm 222 is moveable between a first position (FIGS. 2D and 2F) and a second position (FIG. 2E). The second end 226 of the brush arm 222 including a double-sided contact 228. The first traveler 234 including a first contact 235, the second traveler 236 including a second contact 237. In use, movement of the user accessible actuator 275 between first and second positions causes the second end 226 of the brush arm 222 to selectively contact one of the first or second travelers 234, 236. That is, depending on the position of the user accessible actuator 275, the brush arm 222 moves so that it is in electrical contact with either of the first or second travelers 234, 236. For example, as illustrated, the second end 226 of the brush arm 222 may move up and down so that one of the contacts 228 associated with the second end 226 of the brush arm 222 contacts either the contact 235 associated with the first traveler 234 or the contact 237 associated with the second traveler 236.

In accordance with one or more features of the present disclosure, a novel system and method of providing three-way operation within an electrical switch is provided. As such, while a preferred embodiment of the three-way electrical switch has been shown and described in connection with a particular wire terminal, it should be appreciated that the switch is not so limited and any suitable wire terminal mechanism now known or hereafter developed may be utilized including, for example, non-quick connect systems such as, for example, conventional screw-based terminals may be used.

Referring to FIGS. 3A-3D, an alternate example embodiment of a spring clamp 300 in accordance with one or more features of the present disclosure will be described. As will be appreciated by one of ordinary skill in the art, the spring clamp 300 may be incorporated into any wiring device such as, for example, wiring device 100, wiring device 200, or any other now known or hereafter developed wiring device.

As illustrated, in some embodiments, the spring clamp 300 may include a first or mounting leg 302, a second or biasing leg 304 having a first end and a second end, the first end extending from an end of the first or mounting leg 302, and a third or clamping leg 306 extending from the second end of the second or biasing leg 304. Terms first or mounting used interchangeably herein; second or biasing used interchangeably herein; and third or clamping used interchangeably herein. In this fashion, first, second, and third legs 302, 304, 306 together form a loop in the spring clamp 300. The loop may be either a closed (e.g., complete loop) or a partial (e.g., an open loop). As illustrated, in some embodiments, the spring clamp 300 may be monolithically formed. Alternatively, however, the spring clamp 300 may be manufactured from multiple legs, which may be assembled together.

As illustrated, the third leg 306 of the spring clamp 300 includes an opening 308 arranged and configured to receive a portion of an electrical wire therein. In addition, the opening 308 is arranged and configured to receive a portion, a segment, or a leg of the electrical terminal. In addition, as illustrated, a segment or portion 303 of the first leg 302 of the spring clamp 300 may extend through the opening 308 formed in the third leg 306 of the spring clamp 300. The opening 308 defining an inner edge or surface 309.

In use, the first or mounting leg 302 is arranged and configured to contact, couple to, etc. the electrical terminal so that the portion, segment, or leg of the electrical terminal extends through the opening 308 formed in the third leg 306 of the spring clamp 300. Thus arranged, the opening 308 and the portion, segment, or leg of the electrical terminal define the electrical wire receiving space S. In addition, as previously described, the second or biasing leg 304 is arranged and configured to interact with an actuator such as, for example, actuator (e.g., lever) 152 to enable the spring clamp 300 to transition between a first or closed position and a second or opened position to enlarge the electrical wire receiving space S so that the user can insert the electrical wire into the electrical wire receiving space S (e.g., into the opening 308 formed in the spring clamp 300 between the inner edge or surface 309 and the portion, segment, or leg of the electrical terminal).

Figure 3A:
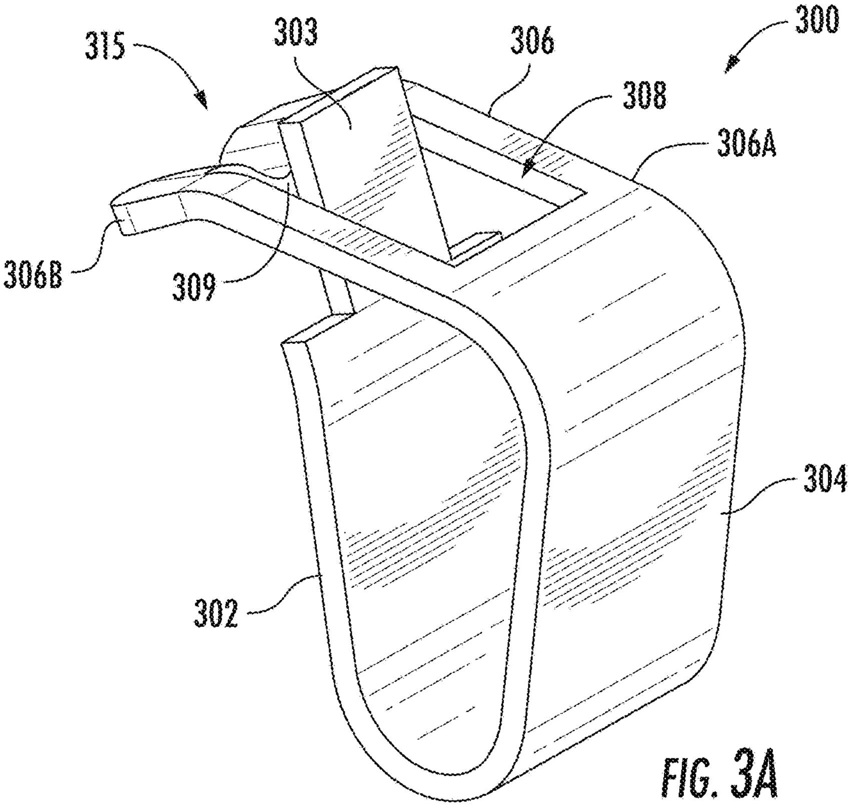
FIG. 3A illustrates a perspective view of an embodiment of a spring clamp in accordance with one or more features of the present disclosure, the spring clamp may be used in the wiring devices of FIGS. 1A, 2B.
Figure 3B:
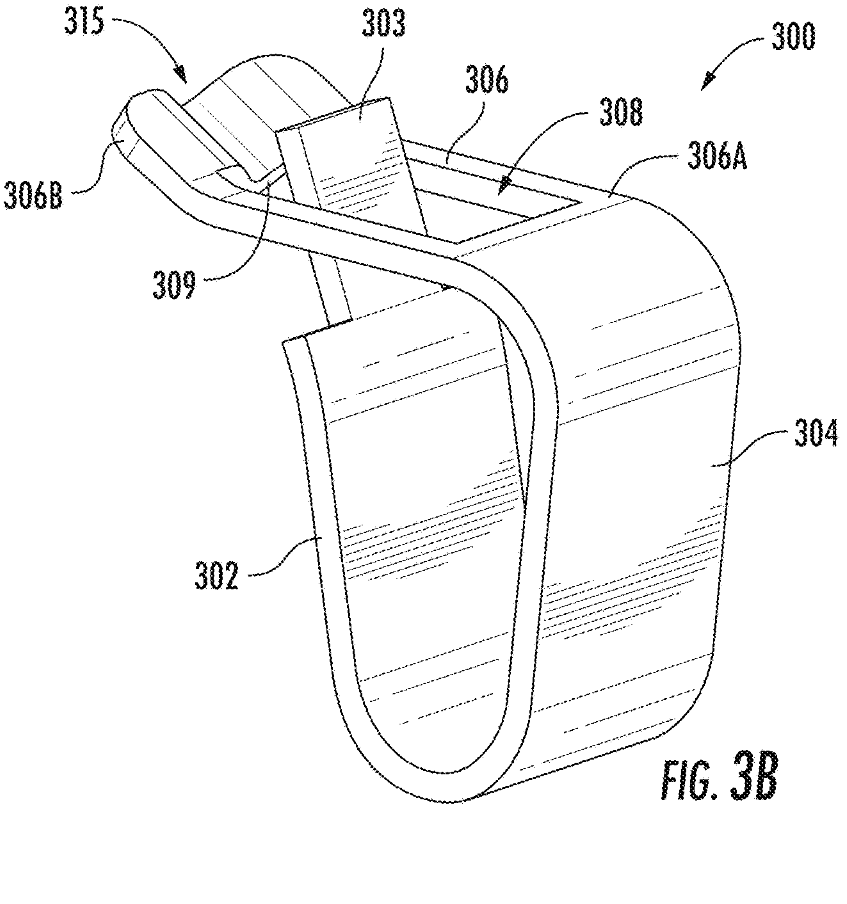
FIG. 3B illustrates a perspective view of an alternate embodiment of a spring clamp in accordance with one or more features of the present disclosure, the spring clamp may be used in the wiring devices of FIGS. 1A, 2B.

In accordance with one or more features of the present disclosure, the inner edge or surface 309 utilizes an enhanced geometry to increase exposure of the leading edge, which results in improved wire retention. For example, with reference to FIG. 3A, the third leg 306 includes a first end 306A and a second end 306B, the first end 306A extending from an end of the second or biasing leg 304. The second end 306B including the inner edge or surface 309 and the enhanced geometry. As illustrated, in some embodiments, the second end 306B including the inner edge or surface 309 may include a groove 315 such as, for example, a V-shaped groove formed therein (e.g., V-shaped groove provided in the leading edge of the third leg). In addition, as illustrated, the second end 306B may be angled relative to other portions (e.g., the first end 306A) of the third leg 306. For example, as illustrated in FIG. 3A, the second end 306B may include a downwardly angled end portion. In some embodiments, the bend angle may be approximately 40-degrees, although this is but one configuration and the bend angle may be altered. For example, it has been discovered that different wire gauges benefit from different bend angles. Thus arranged, by incorporating a groove 315, the surface area of the inner edge or surface 309 is increased (e.g., V-shaped groove 315 increases relative surface area along the point of contact with the electrical wire as compared to a straight inner edge or surface), which results in increased electrical contact and improved mechanical connection (e.g., contact force/increased pull-out strength). Moreover, incorporating an angled leading end portion facilitates space savings (e.g., angling the leading edge decreases the amount of space needed for the wire terminal within the housing of the wiring device) and increases retention force (e.g., angling the leading edge exposes the inner edge or surface 309).

However, it should be appreciated that this is but one configuration and other configurations are envisioned. For example, with reference to FIG. 3B, the second end 306B including the inner edge or surface 309 may include a groove 315 such as, for example, a V-shaped groove formed therein. In addition, as illustrated, the second end 306B may be angled relative to other portions (e.g., the first end 306A)

of the third leg 306. For example, as illustrated, the second end 306B may include an upwardly angled end portion.

Figure 3C:
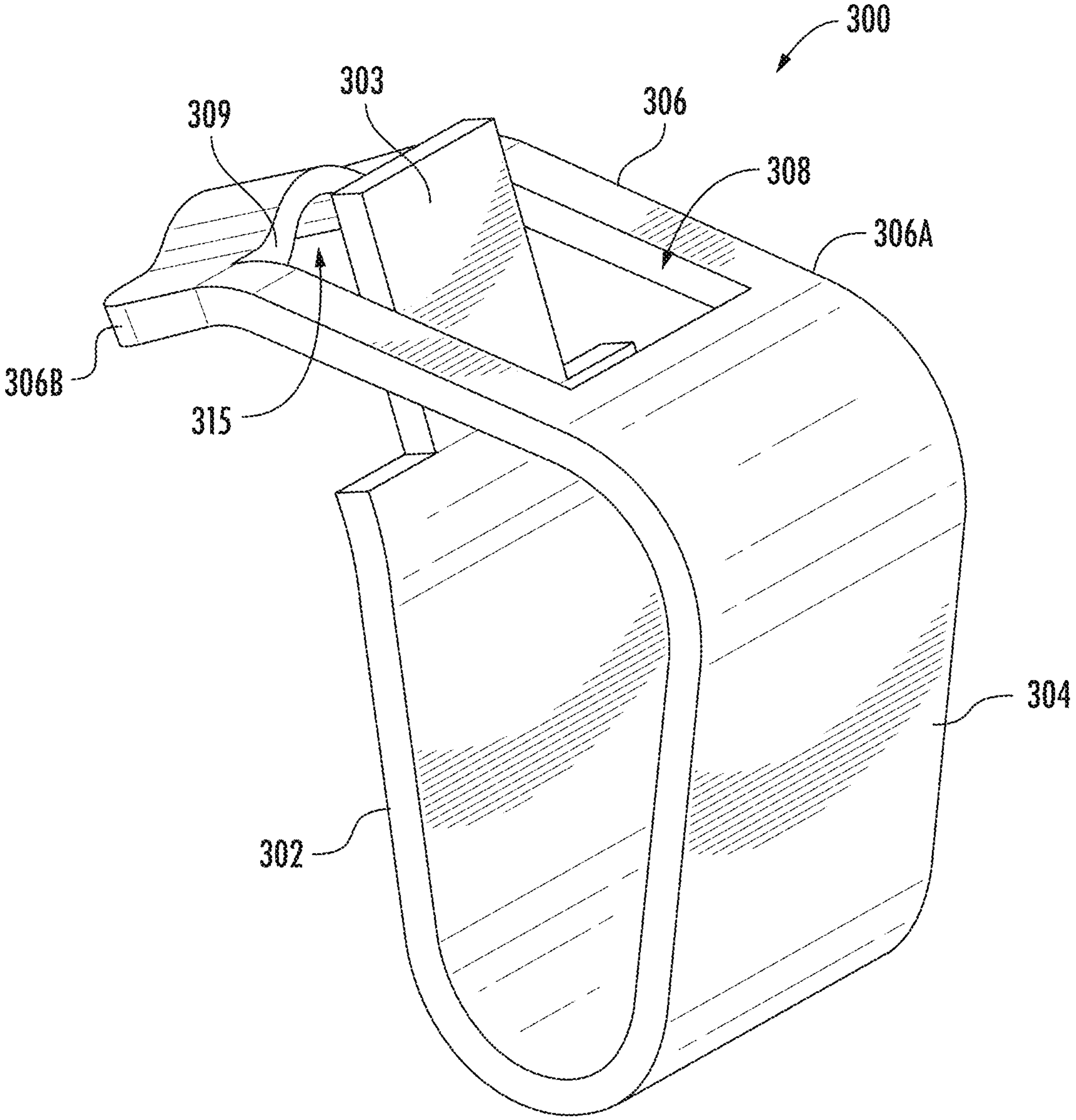
FIG. 3C illustrates a perspective view of an alternate embodiment of a spring clamp in accordance with one or more features of the present disclosure, the spring clamp may be used in the wiring devices of FIGS. 1A, 2B.

With reference to FIG. 3C, the second end 306B including the inner edge or surface 309 may include a groove 315 such as, for example, a V-shaped groove formed therein. As illustrated, the groove 315 may be inverted as compared to the groove 315 illustrated in FIGS. 3A and 3B. In addition, as illustrated, the second end 306B may be angled relative to other portions (e.g., the first end 306A) of the third leg 306. For example, as illustrated, the second end 306B may include a downwardly angled end portion, although this is but one configuration and the second end 306B may include an upwardly angled end portion. Thus arranged, the surface area of the inner edge or surface 309 is increased (e.g., V-shaped groove increases relative surface area along the point of contact with the electrical wire as compared to a straight inner edge or surface), which results in increased electrical contact and improved mechanical connection (e.g., contact force/increased pull-out strength). By providing an inverted groove, increased mechanical contact force has been discovered.

Figure 3D:
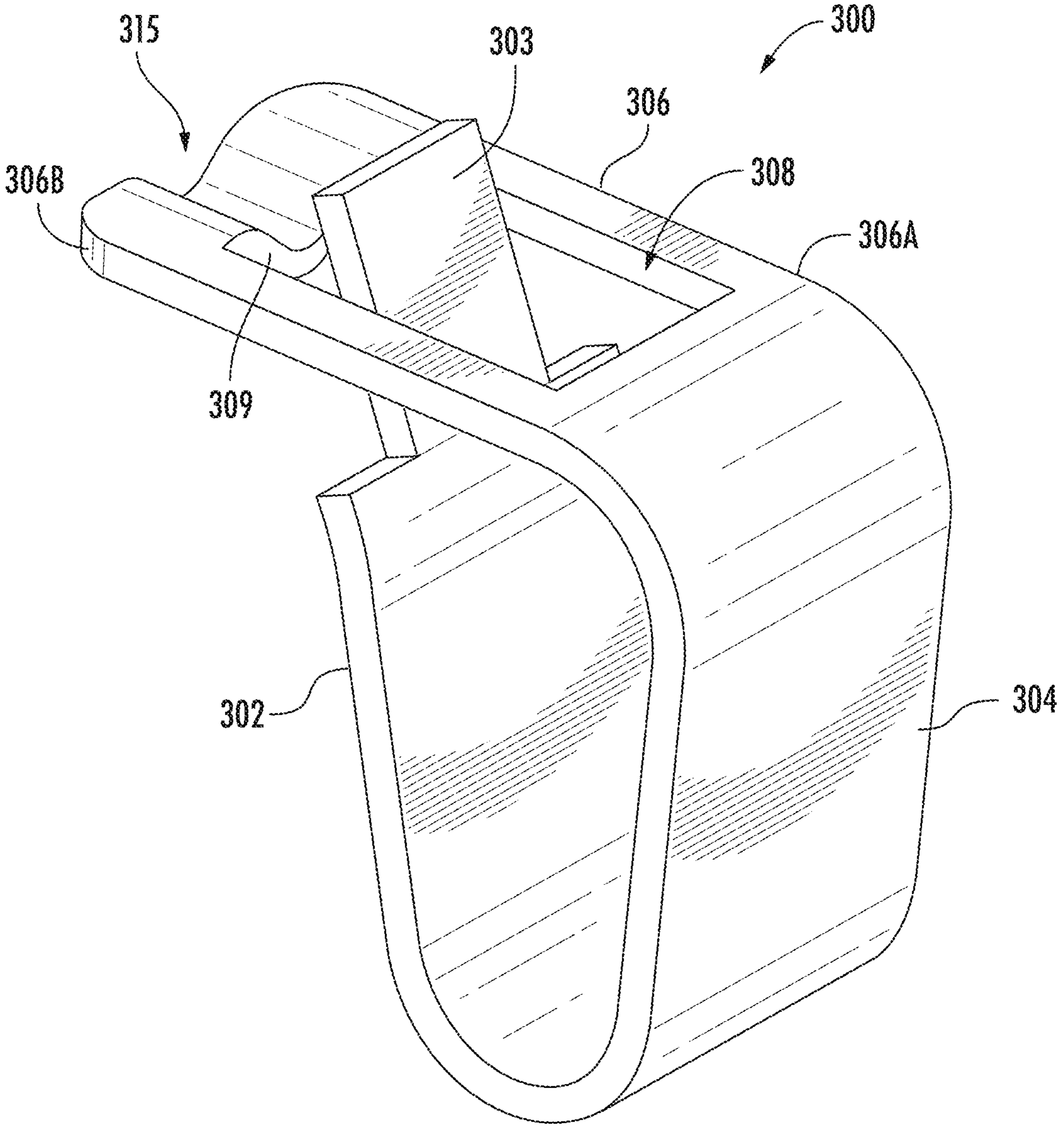
FIG. 3D illustrates a perspective view of an alternate embodiment of a spring clamp in accordance with one or more features of the present disclosure, the spring clamp may be used in the wiring devices of FIGS. 1A, 2B.

With reference to FIG. 3D, the second end 306B including the inner edge or surface 309 may include a groove 315 such as, for example, a V-shaped groove formed therein. As illustrated, the second end 306B may be straight (e.g., devoid of any angle relative to other portions (e.g., the first end 306A) of the third leg 306).

In addition, in some embodiments, the inner edge or surface 309 of the opening 308 in the third leg 306 of the spring clamp 300 may be sharpened (e.g., contain a sharpened edge portion) so that the inner edge 309 may be arranged and configured to "cut" (e.g., engage or bite) into the electrical wire to ensure contact is retained (e.g., to provide additional retention force in maintaining the wire in the electrical wire receiving space S in the first or closed position).

Figure 3E:
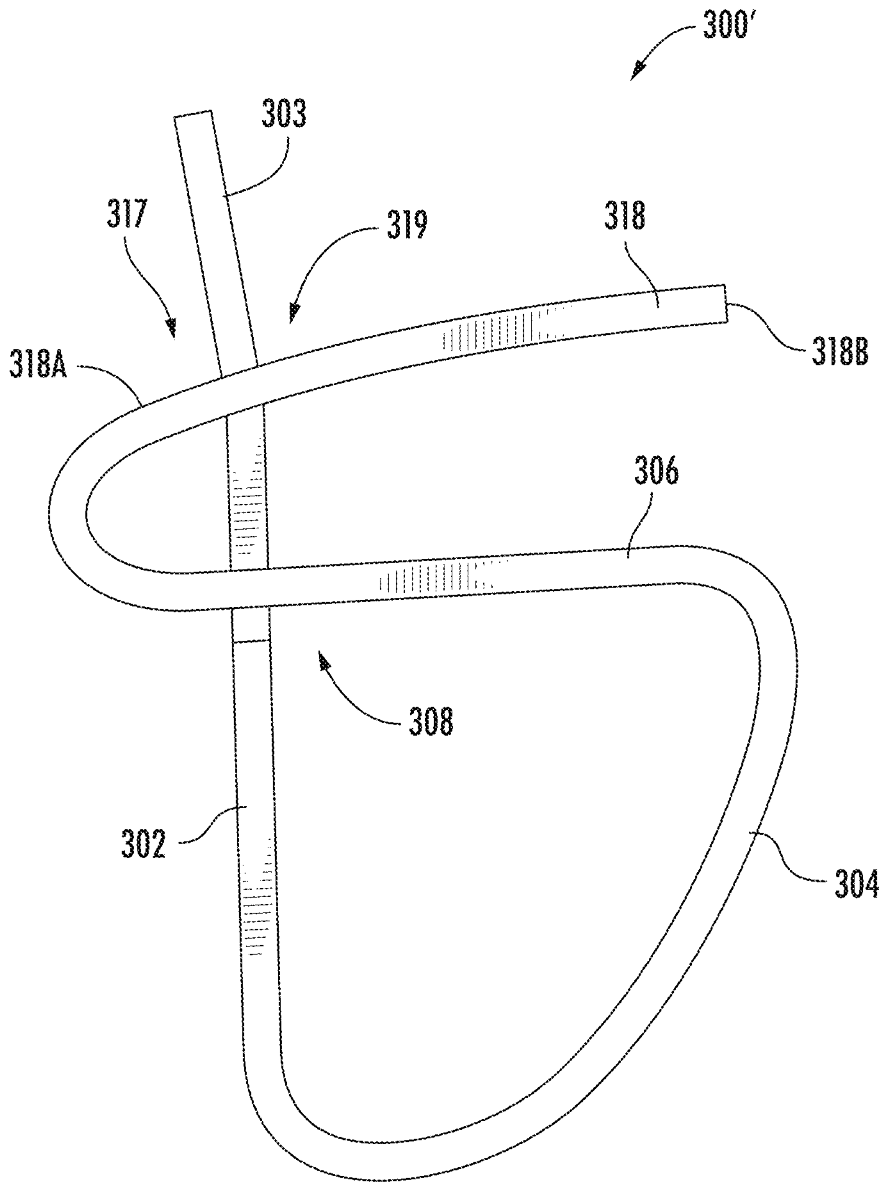
FIG. 3E illustrates a schematical view of an alternate embodiment of a spring clamp in accordance with one or more features of the present disclosure, the spring clamp may be used in the wiring devices of FIGS. 1A, 2B.

With reference to FIG. 3E, an alternate embodiment of a spring clamp 300' is illustrated. As illustrated, the spring clamp 300' includes a fourth leg 318 having a first end 318A and a second end 318B, the first end 318A extending from an end of the third leg 306. Thus arranged, for example, the spring clamp 300 incorporates a double bend to achieve two points of edge contact. As illustrated, the spring clamp 300' may be characterized as having a S-configuration.

In use, the fourth leg 318 also includes an opening 319 arranged and configured to receive a portion of the electrical wire and a portion, a segment, or a leg of the electrical terminal. In addition, a segment or portion 303 of the first leg 302 of the spring clamp 300' may extend through the opening 308 formed in the third leg 306 and through the opening 319 formed in the fourth leg 318. The opening 319 formed in the fourth leg 318 defining an inner edge or surface 317. Thus arranged, the spring clamp 300' provides dual edges or surfaces for contacting the electrical wire received therein resulting in increased electrical contact and improved mechanical connection.

Thus arranged, and as previously mentioned, the spring clamp 300, 300', and more particularly, the first leg 302, may be positioned in contact with the electrical terminal. In some embodiments, the first leg 302 may be coupled to the electrical terminal. The spring clamp 300, 300' may be coupled to the electrical terminal by any suitable mechanism now known or hereafter developed. For example, in some embodiments, the electrical terminal may include a tab, a ledge, a projection, or the like (terms used interchangeably herein without the intent to limit or distinguish) extending therefrom. The spring clamp 300, 300', and more particularly, the first leg 302 of the spring clamp 300, 300' may include an opening for receiving the tab. Thus arranged, in some embodiments, the spring clamp 300, 300' may be press-fitted to the electrical terminal. However, this is but one configuration and other configurations are envisioned. For example, the spring clamp 300, 300' may be welded or crimped to the electrical terminal.

In addition, and/or alternatively, the housing may be arranged and configured to contact the spring clamp 300, 300' such as, a top portion of the spring clamp 300, 300', to secure the spring clamp 300, 300' in position. Moreover, the housing may include additional tabs arranged and configured to interact with the spring clamp 300, 300' to reduce or limit lateral movement of the spring clamp 300, 300'.

In use, the electrical wire receiving space S may be arranged and configured to receive a plurality different wire gauges and types. In use, the wire gauges may be any now known or hereafter developed wire gauges including, for example, the electrical wire receiving space S may be arranged and configured to receive No. 8 American Wire Gauge (AWG), No. 10 AWG, No. 12 AWG, No. 14 AWG, etc. In addition, the electrical wire receiving space S may be arranged and configured to receive stranded wire, solid wire, tinned wire, etc.

In some embodiments, the wire terminal may include a secondary biasing element (e.g., a secondary basing spring) arranged and configured to bias the actuator (e.g., lever) to the first position. Thus arranged, the biasing spring is arranged and configured to assist with maintaining the lever in the first position, and thus prevent, or at least inhibit, inadvertent actuation or movement of the lever to the second position.

While the present disclosure illustrated and described certain specialized electrical wiring devices including commercial or industrial-grade electrical receptacles with a wrap-around electrical strap and three-way electrical switch, it should be appreciated that the spring clamp 300, 300' disclosed herein with reference to FIGS. 3A-3E may be incorporated into any suitable wiring device arranged and configured to receive line-voltage, either now known or hereafter developed such as, for example, an electrical receptacle, a switch, a dimmer, an occupancy sensor, a lighting fixture, a ground/arc fault circuit interrupter, fan speed controls, energy management devices, surge suppressors, and the like. As such, it should be understood that the term "wiring device" is intended to include any of the standard line voltage electrical devices that are now known or hereafter developed. Line voltage refers to a voltage, typically Alternating Current (AC), that is supplied to buildings/residences (e.g., electric light and power), for example, 110 VAC, 115 VAC, 120 VAC, 125 VAC, 208 VAC, 220 VAC, 230 VAC, 240 VAC, single or multiphase. Line voltage devices are distinguished from low voltage devices, which refer to devices that receive a voltage which is less than a certain threshold (50 Volts for example, AC or DC). This reduced voltage is typically used for communication, signaling, data/multimedia transmission, low voltage charging, and the like. As such, the present disclosure should not be limited to any particular line voltage wiring device unless explicitly claimed.

The foregoing description has broad application. While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments. Rather these embodiments should be considered as illustrative and not restrictive in character. All changes and modifications that come within the spirit of the invention are to be considered within the scope of the disclosure. The present disclosure should be given the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art. Unless otherwise defined, all technical terms used herein have the same meaning as commonly understood by one of ordinary skill in the art to which the disclosure belongs.

Directional terms such as top, bottom, superior, inferior, medial, lateral, anterior, posterior, proximal, distal, upper, lower, upward, downward, left, right, longitudinal, front, back, above, below, vertical, horizontal, radial, axial, clockwise, and counterclockwise) and the like may have been used herein. Such directional references are only used for identification purposes to aid the reader's understanding of the present disclosure. For example, the term "distal" may refer to the end farthest away from the medical professional/operator when introducing a device into a patient, while the term "proximal" may refer to the end closest to the medical professional when introducing a device into a patient. Such directional references do not necessarily create limitations, particularly as to the position, orientation, or use of this disclosure. As such, directional references should not be limited to specific coordinate orientations, distances, or sizes, but are used to describe relative positions referencing particular embodiments. Such terms are not generally limiting to the scope of the claims made herein. Any embodiment or feature of any section, portion, or any other component shown or particularly described in relation to various embodiments of similar sections, portions, or components herein may be interchangeably applied to any other similar embodiment or feature shown or described herein.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. Furthermore, references to "one embodiment" of the present disclosure are not intended to be interpreted as excluding the existence of additional embodiments that also incorporate the recited features.

In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

As used herein, an element or step recited in the singular and proceeded with the word "a" or "an" should be understood as not excluding plural elements or steps, unless such exclusion is explicitly recited. It will be further understood that the terms "comprises" and/or "comprising," or "includes" and/or "including" when used herein, specify the presence of stated features, regions, steps, elements and/or components, but do not preclude the presence or addition of one or more other features, regions, integers, steps, operations, elements, components and/or groups thereof.

The phrases "at least one," "one or more," and "and/or," as used herein, are open-ended expressions that are both conjunctive and disjunctive in operation. The terms "a" (or "an"), "one or more" and "at least one" can be used interchangeably herein.

Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority but are used to distinguish one feature from another. The drawings are for purposes of illustration only and the dimensions, positions, order and relative to sizes reflected in the drawings attached hereto may vary.

The foregoing discussion has been presented for purposes of illustration and description and is not intended to limit the disclosure to the form or forms disclosed herein. For example, various features of the disclosure are grouped together in one or more embodiments or configurations for the purpose of streamlining the disclosure. However, it should be understood that various features of the certain embodiments or configurations of the disclosure may be combined in alternate embodiments or configurations. Moreover, the following claims are hereby incorporated into this Detailed Description by this reference, with each claim standing on its own as a separate embodiment of the present disclosure.

What is claimed is:

1. An electrical receptacle comprising:

a housing;

an electrical terminal disposed at least partially within the housing;

a plurality of wire terminals arranged and configured to mechanically and electrically secure a line-voltage AC electrical wire to the electrical terminal, each wire terminal including:

an actuator moveable between a first position and a second position; and a spring clamp including an opening, the opening at least partially defining an electrical wire receiving space configured to receive the electrical wire;

wherein, in the second position, the actuator manipulates the spring clamp to enlarge the electrical wire receiving space to receive the electrical wire, and, in the first position, the actuator allows the spring clamp to return to an initial configuration, the initial configuration arranged and configured to reduce the electrical wire receiving space, wherein when the electrical wire is present, the electrical wire is biased into contact with the electrical terminal to securely retain the electrical wire within the electrical wire receiving space and in contact with the electrical terminal; and an electrical strap including a rear portion arranged and configured to contact a rear surface of the housing, a top portion extending from a first end of the rear portion and arranged and configured to contact a top portion of the housing, a bottom portion extending from a second end of the rear portion and arranged and configured to contact a bottom portion of the housing, and a ground tab arranged and configured to electrically contact a ground wire during use;

wherein the housing includes a ground tab opening formed in the rear surface of the housing, the ground tab opening arranged and configured to receive the ground tab.

2. The electrical receptacle of claim 1, wherein the ground tab is positioned within the ground tab opening via the rear surface of the housing and the spring clamp is positioned within the housing via a front surface thereof.

3. The electrical receptacle of claim 1, wherein the ground tab extends from the bottom portion of the electrical strap.

4. The electrical receptacle of claim 1, wherein the electrical strap and the ground tab are monolithically formed in one piece.

5. The electrical receptacle of claim 1, wherein the housing further includes a plurality of openings formed in a rear surface thereof to receive a plurality of electrical wires, respectively, coupled to line voltage therein.

6. The electrical receptacle of claim 1, wherein the spring clamp includes a first leg arranged and configured to contact the electrical terminal, a second leg having a first end extending from an end of the first leg, and a third leg extending from a second end of the second leg, the third leg including the opening, the opening defining an inner surface arranged and configured to contact the electrical wire when in the first position, wherein the third leg includes a first end and a second end, the first end extending from the second end of the second leg, the second end including the inner surface and a groove extending from the inner surface to the second end thereof.

7. The electrical receptacle of claim 1, wherein the spring clamp includes a plurality of legs, wherein one of the plurality of legs includes:

a first end;

a second end; and the opening, the opening defining an inner surface arranged and configured to contact the electrical wire when in the first position, and a groove extending from the inner surface to the second end thereof.

8. The electrical receptacle of claim 7, wherein the groove comprises a V-shaped groove.

9. The electrical receptacle of claim 7, wherein the second end of the leg is angled relative to the first end of the leg.

10. The electrical receptacle of claim 9, wherein the second end of the leg includes an angled end portion that projects away from an insertion direction of the electrical wire when the electrical wire is being received within the electrical wire receiving space.

11. The electrical receptacle of claim 9, wherein the second end of the leg includes an angled end portion that projects towards an insertion direction of the electrical wire when the electrical wire is being received within the electrical wire receiving space.

12. An electrical switch comprising:

a housing;

a user accessible actuator extending from the housing, the user accessible actuator moveable between a first position and a second position;

an electrical terminal positioned at least partially within the housing, the electrical terminal including:

a brush arm including a first end and a second end;

a first common contact arranged and configured in electrical contact with the first end of the brush arm;

a second common contact arranged and configured in electrical contact with the first end of the brush arm;

a first traveler contact;

a second traveler contact;

wherein movement of the user accessible actuator to the first position moves the second end of the brush arm into contact with one of the first and second traveler contacts; and wherein movement of the user accessible actuator to the second position moves the second end of the brush arm into contact with the other one of the first and second traveler contacts.

13. The electrical switch of claim 12, wherein the second end of the brush arm includes a contact having first and second contact portions, the first traveler including a first contact configured to selectively contact one of the first and second contact portions, and the second traveler includes a second contact configured to selectively contact the other side of the first and second contact portions.

14. The electrical switch of claim 13, wherein the contact of the brush arm is a double-sided contact wherein the first contact portion is one side of the double-sided contact and the second contact portion is the other side of the double-sided contact.

15. The electrical switch of claim 13, further comprising a plurality of wire terminals positioned at least partially within the housing, the wire terminals arranged and configured to mechanically and electrically secure a line-voltage AC electrical wire to the electrical terminal, each wire terminal including:

an actuator moveable between a first position and a second position; and a spring clamp including an opening, the opening at least partially defining an electrical wire receiving space configured to receive the electrical wire;

wherein, in the second position, the actuator manipulates the spring clamp to enlarge the electrical wire receiving space to receive the electrical wire, and, in the first position, the actuator allows the spring clamp to return to an initial configuration, the initial configuration arranged and configured to reduce the electrical wire receiving space, wherein if an electrical wire is present, the electrical wire is biased into contact with the electrical terminal to securely retain the electrical wire within the electrical wire receiving space and in contact with the electrical terminal.

16. The electrical switch of claim 15, wherein the spring clamp includes a first leg arranged and configured to contact the electrical terminal, a second leg having a first end extending from an end of the first leg, and a third leg extending from a second end of the second leg, the third leg including the opening, the opening defining an inner surface arranged and configured to contact the electrical wire when in the first position, wherein the third leg includes a first end and a second end, the first end extending from the second end of the second leg, the second end including the inner surface and a groove extending from the inner surface to the second end thereof.

17. The electrical switch of claim 16, wherein the groove comprises a V-shaped groove.

18. The electrical switch of claim 16, wherein the second end of the third leg is angled relative to the first end of the third leg.

19. A spring clamp arranged and configured to be used in a wire termination mechanism in an electrical wiring device, the spring clamp:

a first leg arranged and configured to contact an electrical terminal positioned within the electrical wiring device;

a second leg having a first end extending from an end of the first leg, the second leg being arranged and configured to interact with an actuator to enable the spring clamp to transition between a first position and a second position; and a third leg extending from a second end of the second leg;

wherein the third leg includes an opening arranged and configured to receive a portion of an electrical wire therein and a portion of the electrical terminal, the opening defining an inner edge arranged and configured to contact an electrical wire; and wherein the third leg includes a first end and a second end, the first end extending from the second end of the second leg, the second end including the inner edge and a groove extending from the inner edge to the second end thereof.

20. The spring clamp of claim 19, wherein the groove comprises a V-shaped groove.

21. The spring clamp of claim 19, wherein the second end of the third leg is angled relative to the first end of the third leg.

* * * * *